United States Patent
Armau et al.

(10) Patent No.: US 9,168,520 B2
(45) Date of Patent: Oct. 27, 2015

(54) CHAMBER FOR SEALED JUNCTION DEVICE AND ASEPTIC TRANSFER DEVICE

(75) Inventors: Stephanie Armau, Ossun (FR); Isabelle Gay, Peypin (FR); Gaelle Nodin, Saint Maximin la Sainte Baume (FR)

(73) Assignee: SARTORIUS STEDIM ASEPTICS, Lourdes (FR)

( * ) Notice: Subject to any disclaimer, the term of this patent is extended or adjusted under 35 U.S.C. 154(b) by 361 days.

(21) Appl. No.: 13/511,210

(22) PCT Filed: Nov. 23, 2010

(86) PCT No.: PCT/FR2010/052491
§ 371 (c)(1),
(2), (4) Date: Jul. 30, 2012

(87) PCT Pub. No.: WO2011/061464
PCT Pub. Date: May 26, 2011

(65) Prior Publication Data
US 2012/0292311 A1 Nov. 22, 2012

(30) Foreign Application Priority Data

Nov. 23, 2009 (FR) ..................................... 09 58270

(51) Int. Cl.
*B01L 99/00* (2010.01)
*B01L 1/02* (2006.01)
(Continued)

(52) U.S. Cl.
CPC .. *B01L 1/02* (2013.01); *F16J 13/02* (2013.01); *F16J 13/18* (2013.01); *F16J 13/22* (2013.01);
(Continued)

(58) Field of Classification Search
CPC ....... B01L 1/00; B01L 1/02; B01L 2300/041; B01L 2300/043; B01L 2300/045; B01L 3/50825; B01L 2300/04; F16J 13/16; F16J 13/18; F16J 13/22
USPC .............................. 422/544, 565, 568; 49/507
See application file for complete search history.

(56) References Cited

U.S. PATENT DOCUMENTS

| 3,489,298 A | 1/1970 | Samsel et al. |
| 5,421,626 A | 6/1995 | Glachet |

(Continued)

FOREIGN PATENT DOCUMENTS

| EP | 0 586 307 A1 | 3/1994 |
| EP | 0 662 373 A1 | 7/1995 |

(Continued)

OTHER PUBLICATIONS

International Search Report, dated Feb. 24, 2011, from corresponding PCT application.

*Primary Examiner* — Jill Warden
*Assistant Examiner* — Dwayne K Handy
(74) *Attorney, Agent, or Firm* — Young & Thompson

(57) ABSTRACT

The invention relates to a housing (1) that is especially designed to be associated with a device for a tight connection to a second housing (2), said first housing comprising a structure including a wall (3) defining a space (1*a*), an opening (4) defined by a flange (5) that can be hermetically applied to a second flange (9) of the second housing (2), holding means that can keep the first flange and the second flange (9) applied to each other, a door (6) supported by carrying means (11 *a*), the door leaf (6*v*) being mobile in such a way as to be closed or open and having an outer face (6*a*) that can ensure the hermetic application of a second door (10) of the second housing (2), fixing means for holding the leaves (6*v*, 1 Ov) against each other, displacement manoeuvring means (11*b*), and means for controlling the displacement manoeuvring means (11*b*), and, when the leaf (6*v*) is open, an inlet/outlet space (13*a*) in/of the inner space (1*a*) forming part of a communication space (13) between the two housings (1, 2), wherein the carrying means (11*a*) and the displacement manoeuvring means (11*b*) for the door (6) are arranged in such a way that, when the leaf (6*v*) is open, it extends essentially past the limit (13*b*, 13*c*) of the inlet/outlet space (13*a*), a distancing space (12) being thus created between the inlet/outlet space (13*a*) and the leaf (6*v*) in the open state.

22 Claims, 14 Drawing Sheets

(51) Int. Cl.
  *F16J 13/02* (2006.01)
  *F16J 13/18* (2006.01)
  *F16J 13/22* (2006.01)
  *G21F 7/005* (2006.01)

(52) U.S. Cl.
  CPC ...... *B01L 2200/141* (2013.01); *B01L 2300/041* (2013.01); *B01L 2300/043* (2013.01); *B01L 2300/045* (2013.01); *G21F 7/005* (2013.01)

(56) References Cited

U.S. PATENT DOCUMENTS

| | | |
|---|---|---|
| 5,853,207 A | 12/1998 | Saint Martin et al. |
| 6,307,206 B1 | 10/2001 | Riviere et al. |
| 6,553,722 B1 | 4/2003 | Porret et al. |
| 6,591,662 B1 | 7/2003 | Grimard et al. |
| 2005/0168117 A1 | 8/2005 | Porret |
| 2009/0212054 A1 | 8/2009 | Allen, Jr. |

FOREIGN PATENT DOCUMENTS

| | | |
|---|---|---|
| EP | 0 688 020 A1 | 12/1995 |
| EP | 0 730 907 A2 | 9/1996 |
| EP | 0 830 896 A2 | 3/1998 |
| EP | 0 830 907 A2 | 3/1998 |
| EP | 0 960 698 A1 | 12/1999 |
| EP | 1 141 974 B1 | 5/2004 |
| EP | 1 141 672 B1 | 10/2004 |
| EP | 2 091 051 A1 | 8/2009 |
| EP | 1 454 328 B1 | 2/2010 |
| FR | 2 787 235 A1 | 6/2000 |
| FR | 2 833 745 A1 | 6/2003 |
| WO | 95/34078 A1 | 12/1995 |
| WO | 96/21615 A2 | 7/1996 |
| WO | 03/041087 A1 | 5/2003 |

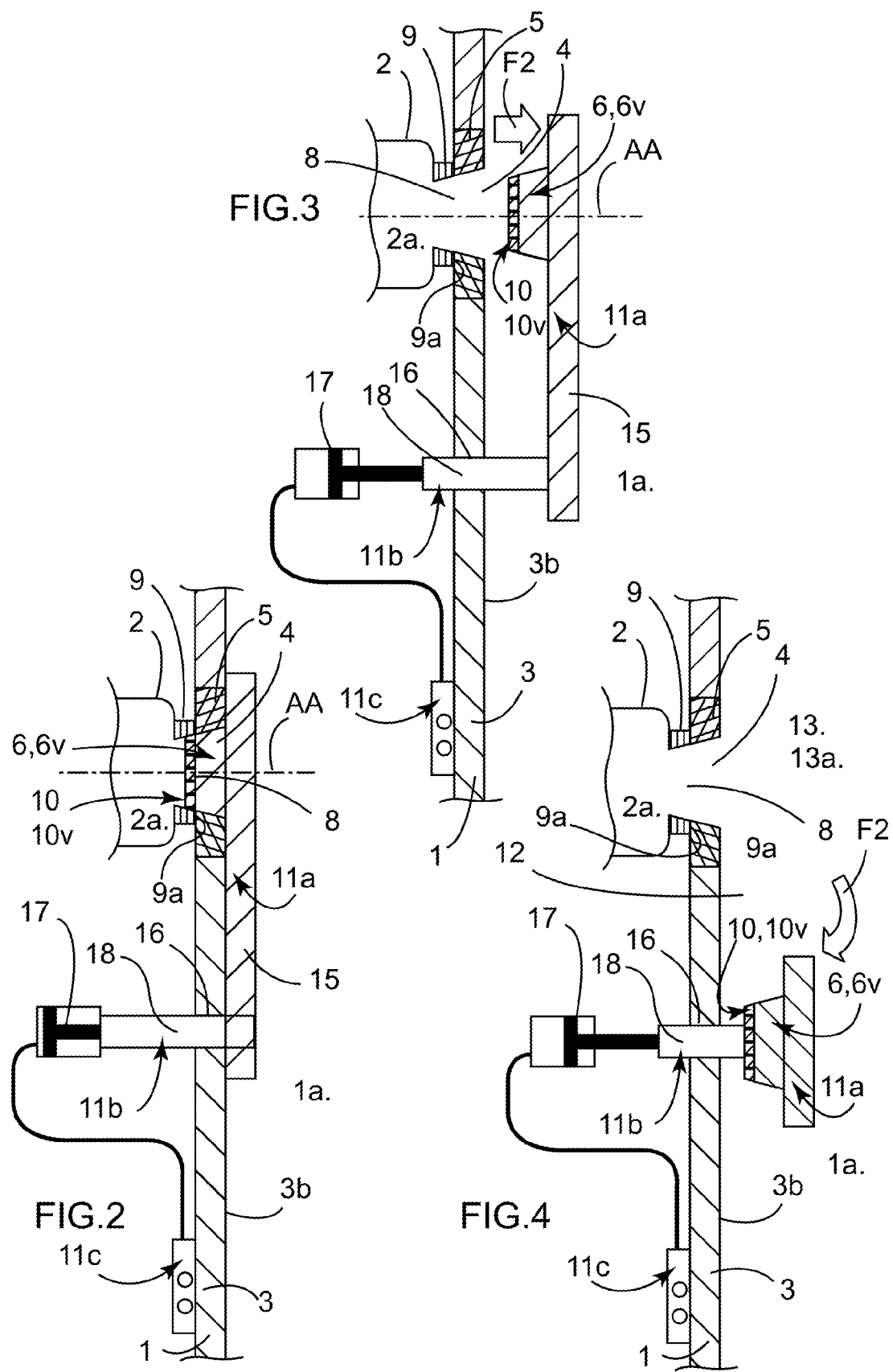

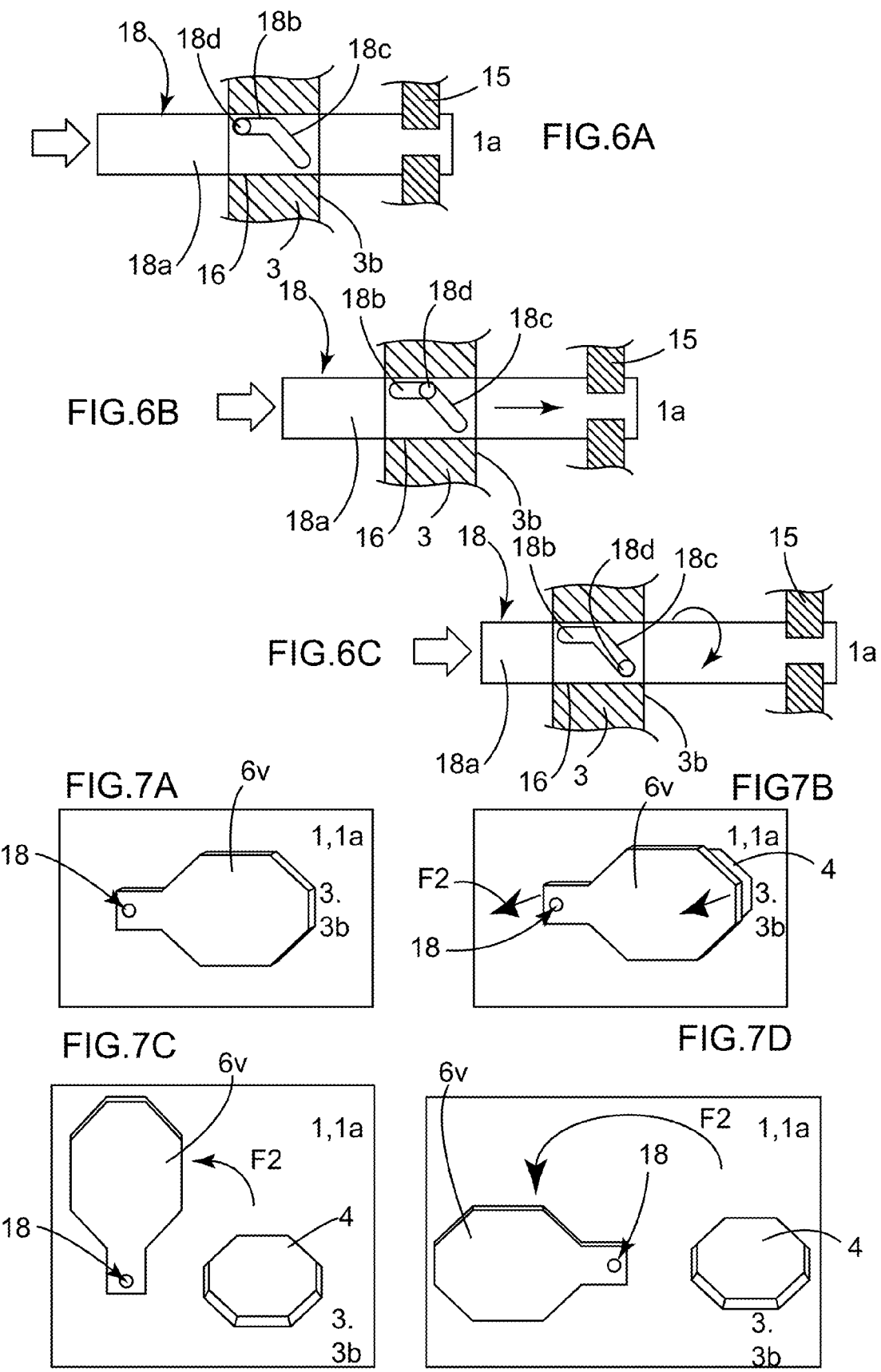

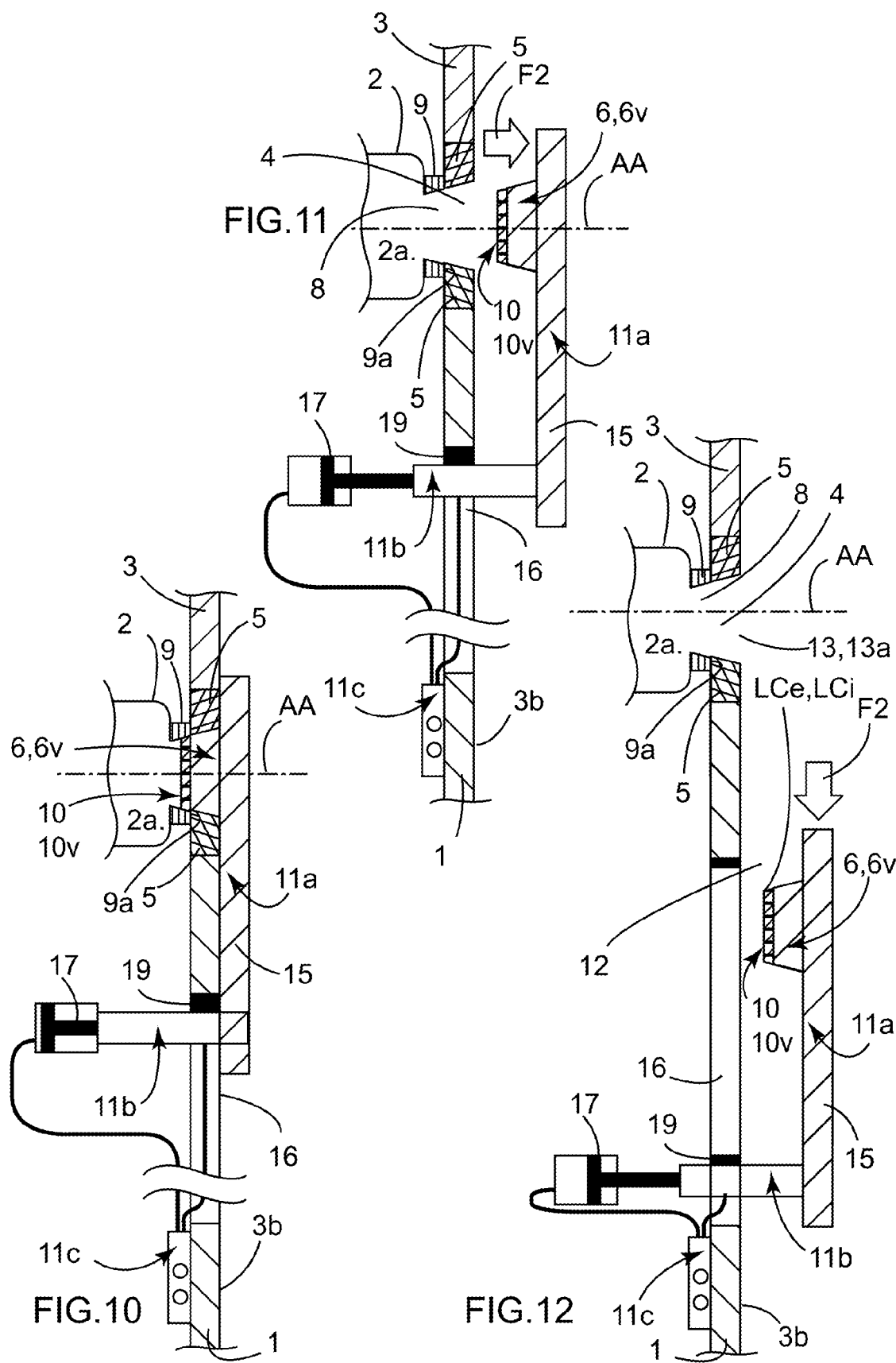

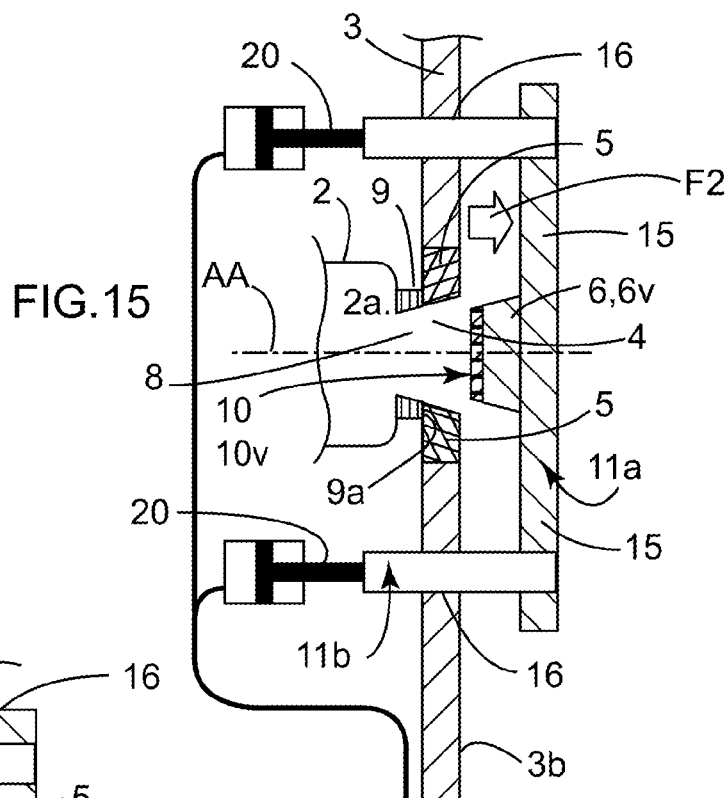
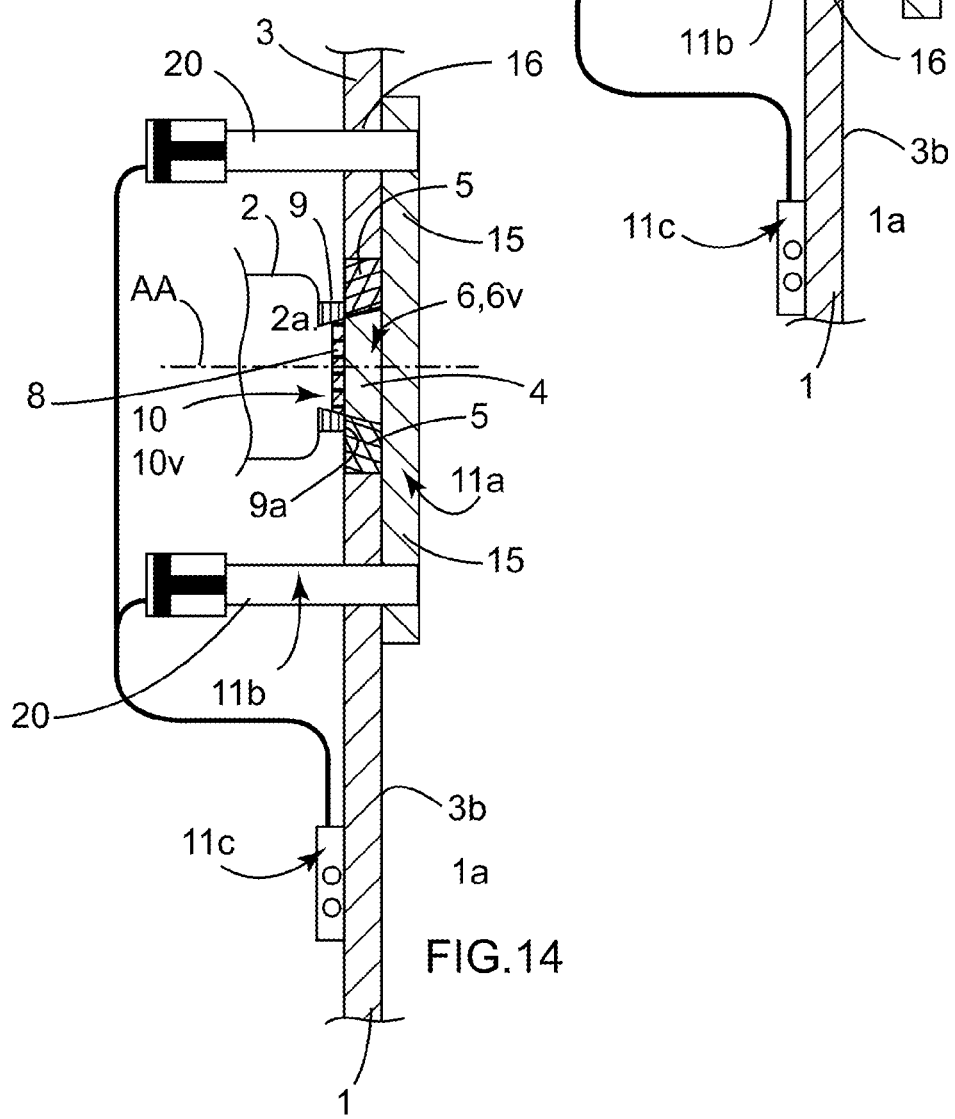
FIG.15
FIG.14

CHAMBER FOR SEALED JUNCTION DEVICE AND ASEPTIC TRANSFER DEVICE

FIELD OF THE INVENTION

The invention relates to a chamber designed to be part, with a second chamber, of a sealed junction device and of an aseptic transfer device.

BACKGROUND OF THE INVENTION

Aseptic transfer devices of the double-door type are already known. Purely by way of example, the devices known under the trademark BIOSAFE® and the sealed junction devices between a first chamber and a second chamber isolated from an external environment that are described in the document EP-A-0688020 can be cited.

The object of the invention is said first chamber of devices of this type. In the text as a whole, this chamber is most often called "chamber" or sometimes "first chamber" particularly to distinguish it from the other chamber of the junction device and of the transfer device, this other chamber being called "second chamber." It is understood that the term "chamber" without any other details and the expression "first chamber" are synonyms and indicate the same object.

A first known chamber such as the one used in the biopharmaceutical field is typically stationary, rigid, and of relatively large size, and it comprises:

A structure that includes a closed wall that borders an inside space,

At least one opening—the diameter of which can typically be on the order of 10 to 40 centimeters—made in the wall and bordered by an annular flange whose outside surface is able to ensure the hermetically-sealed flattening onto itself of the outside surface of a second complementary flange that is part of the second chamber, Removable holding means, at least partly combined with the flange, able to hold—in a removable way—the flange and the second flange that are flattened against one another by their outside surfaces, A door supported by the structure by means of carrying means, of a mechanical, movable, or deformable nature, the panel of which is arranged and mounted so as to be able to be moved to be either in the closed state where it works with the flange while closing the opening or in the open state where it is separated from the flange and placed in the inside space while opening the opening, and whose outside surface is able to ensure the hermetically-sealed flattening onto itself of the outside surface of the panel of a second complementary door that is part of the second chamber, Removable interlocking means at least partly combined with the door, able to hold—in a removable way—the panel and the second panel that are flattened against one another by their outside surfaces, Movement actuation means able to move the panel, with which the second panel is interlocked, between its closed and open states, and means for monitoring the movement actuation means, And, when the panel is in the open state, an entrance/exit space in/of the inside space, in the general shape of a truncated cylinder, cone, or pyramid, that extends into the inside space at least approximately axially from the opening and from the flange, able to make it possible to pass certain contents into/out of the inside space from one to the other of the two chambers.

The second chamber is typically a movable container, disposable, at least partly flexible and of a smaller size, and it comprises the second wall equipped with the second opening bordered by the second annular flange that forms, on the one hand, an interface with the first flange, and, on the other hand, a seat for the second door whose panel is mounted for movement and arranged to be in the closed state or in the open state where, respectively, it closes or opens the second opening.

In the case of the embodiment known under the BIOSAFE® trademark, the carrying means and the movement actuation means of the first door and of its panel comprise a hinge whose axis—vertical and lateral—is located in the first chamber itself (the inside space of this first chamber), in or near the inside surface of its wall, near its opening and its flange, the pivoting around the hinge being performed manually or in a motorized way (actuator, motor . . . ). In the closed state, the panel is retracted in or in the vicinity of the plane of the wall, of the opening and of the flange. In the open state, the panel is projecting, in particular placed more or less perpendicularly to the plane of the wall, of the opening, and of the flange. The movement of the panel between its closed state and its open state (and vice versa) is on the order of one-third of a rotation. As for the movement actuation means, such as an actuator, motor . . . , they are able to move the panel to rotate on this course.

In the embodiments described in the document EP-A-2091051, where the axis is also vertical and lateral, in the documents EP-A-1 141 974, EP-A-1 454 328, EP-A-0 730 907, EP-A-0 830 896 where the axis is inferior horizontal (below the opening and the flange) and in the document EP-A-0 662 373, where the axis is superior horizontal, in the open state, the panel is also projecting and more or less perpendicular to the plane of the wall, the opening and the flange.

When the two chambers are in communication with one another through their respective openings in the open state, the entrance/exit space is part of a communication space between the two chambers that makes it possible to pass certain contents from one to the other of the two chambers and, thus, to transfer them from one chamber to the other.

In these embodiments, in the open state of the panel, the panel is laterally adjacent to the lateral boundary of the entrance/exit space, which can pose the problem that the panel is an impediment to the use of the sealed junction device and of the aseptic transfer device because a panel obstructs the passage of the certain contents from one of the two chambers to the other and, also, because the certain contents can reach the panel during their passage into the entrance/exit space, with risks of deterioration or contamination.

Transfers, such as those in question, can be necessary in a number of technical fields, particularly but not exclusively the biopharmaceutical field. The invention focuses especially on this field, as on those that can be considered as similar with regard to the requirements imposed.

Transfers, such as those considered here, occur most often in the framework of more complex processes in which the certain contents undergo one or more operations before and/or after the transfer. These operations consist in manufacturing, assembly, treatment, handling, use, measurement, monitoring, analysis, or the like . . . .

In the case of an operating line, a chamber can be provided that comprises a wall equipped with the same plurality of openings and doors, as well as sealed junction devices with a multiplicity of second chambers.

As document EP-A-1141672 states, one skilled in the art knows that with the type of aseptic transfer device under consideration, there exists what is called a "critical line"

having residual contamination by the environment external to the two chambers. It is possible that this line comes into contact with the external environment that is found in the passage between the two chambers or into contact with the contents passing through this passage to be transferred from one chamber to the other, with, as a consequence, contamination. This critical line is sometimes called "critical zone" or "ring of concern" (see PIC/S—Pharmaceutical Inspection Convention—*RECOMMENDATION—ISOLATORS USED FOR ASEPTIC PROCESSING AND STERILITY TESTING*).

An inside critical line is found on the outside surface of the first door, more precisely of its panel, in contact with the external environment and not overlapped by the outside surface of the second door, more precisely of its panel, when the two panels are flattened against one another. An outside critical line is found on the outside surface of the second flange in contact with the external environment and not overlapped by the outside surface of the first flange, when the two flanges are flattened against one another.

Embodiments such as those described in the documents EP-A-1 141 974, EP-A-1 454 328, EP-A-0 730 907, EP-A-0 830 896, EP-A-0 662 373 and EP-A-2091051 have as a drawback that in its open state, the panel is close to the opening of the chamber and of the entrance/exit space, so that the certain contents can reach the panel during their passage into the entrance/exit space, with the inherent risks of deterioration, contamination . . . .

Several solutions have been proposed for the purpose of overcoming the risk of contamination in the critical lines, a risk that is also mentioned in *ISOLATION TECHNOLOGY—A PRACTICAL GUIDE*, published by CRC Press in 2004.

The document EP-A-0960698 provides decontamination means using ultraviolet, pulsed-ultraviolet, or pulsed-light radiation. The document EP-A-0662373 provides that a flanged ring of the aseptic transfer device comprises a heat-resistant annular element. Variants of heating technology are described in the documents EP-A-730907 and EP-A-830907. The technology of sterilization by dry heat has been indicated as being the preferred solution according to the presentation made by the Barrier Users Group Symposium (BUGS) at the conference of Jan. 17 and 18, 1995. The document EP-A-1454328 describes an aseptic transfer device that comprises a device for protection of the single outside critical line.

The state of the art also comprises the documents U.S. Pat. No. 3,489,298, EP 0586307, EP 0 830896, WO 03/041087, WO 95/34078, FR2833745, FR 2787 235, US 2009/212054 and WO 96/21615. However, none of these documents provides for the chamber being such that:

On the one hand, the carrying means and the movement actuation means are arranged so that in the open state of the panel, the panel is substantially separated beyond the boundary of the entrance/exit space, and so that thus an empty separation space is made between the entrance/exit space and the panel in the open state, beyond the lateral boundary and the distal end boundary of the entrance/exit space opposite the opening and the flange;

And, on the other hand, the carrying means and the movement actuation means, structurally integrated into the door, constitute means for protection against the risks of contamination for the inside critical line, constituted by the separation space of appropriate size formed and placed between the entrance/exit space and the inside critical annular line, so that the certain contents normally cannot reach the panel during their passage into the entrance/exit space.

The problem at the base of the invention is to equip a (first) chamber designed to be part of a sealed junction device and of an aseptic transfer device with a second chamber of a structure such that the (first) panel of the (first) door of the (first) chamber in the open state is not an impediment to the use of the sealed junction device and of the aseptic transfer device, particularly does not obstruct the passage of the certain contents from one to the other of the two chambers, especially the passage of the certain contents into the entrance/exit space of the first chamber, and also that the certain contents cannot reach the first panel during their passage into the entrance/exit space, with the advantage of overcoming the risks of deterioration or contamination when that is not the case. In other words, the invention aims at seeing to it that the entrance/exit space and the communication space are separated, which is particularly useful, for example, for the passage of certain powdered contents when a transfer cone is used.

Another aspect of the problem on which the invention is based is to produce a chamber whose opening has a diameter that is larger than the currently typical openings—on the order of 10 to 40 centimeters. Such a wider opening increases the obstruction problem previously mentioned.

SUMMARY OF THE INVENTION

To that end, and according to a first aspect, the invention has as its object a chamber specially designed to be combined, in a sealed junction device, with a second chamber of the type comprising:

A structure that includes a closed wall that borders an inside space,

At least one opening made in the wall and bordered by an annular flange whose outside surface is able to ensure the hermetically-sealed flattening onto itself of the outside surface of a second complementary flange that is part of the second chamber, Movable holding means, at least partly combined with the flange, able to hold—in a removable way—the flange and the second flange that are flattened against one another by their outside surfaces, A door supported by the structure by means of movable or deformable carrying means, the panel of which is arranged and mounted so as to be able to be moved to be either in the closed state where it works with the flange on closing the opening or in the open state where it is separated from the flange and placed in the inside space on opening the opening, and whose outside surface is able to ensure the hermetically-sealed flattening onto itself of the outside surface of the panel of a second complementary door that is part of the second chamber, Movable interlocking means at least partly combined with the door, able to hold—in a removable way—the panel and the second panel that are flattened against one another by their outside surfaces, Movement actuation means able to move the panel between its closed and open states, and means for monitoring the movement actuation means, And, when the panel is in the open state, the entrance/exit of the chamber being separated, an entrance/exit space in/of the inside space, in the general shape of a truncated cylinder, cone, or pyramid, that extends into the inside space at least approximately axially from the opening and from the flange, this entrance/exit space being part of a communication space between the two combined chambers and able to make it possible to have certain contents pass into/out of the inside space, from one to the other of the two chambers, An inside critical annular line of contamination risk existing on the outside surface of the panel in contact with the external environment and not overlapped by the outside surface of the panel, when the panels are flattened against one another.

This chamber is such that:

On the one hand, the carrying means and the movement actuation means are arranged so that in the open state of the panel, the panel is substantially separated beyond the boundary of the entrance/exit space, an empty separation space thus being made between the entrance/exit space and the panel in the open state, beyond the lateral boundary and the distal end boundary of the entrance/exit space opposite the opening and the flange;

And, on the other hand, the carrying means and the movement actuation means, structurally integrated into the door, constitute means for protection against the risks of contamination for the inside critical line constituted by the separation space of appropriate size formed and placed between the entrance/exit space and the inside critical annular line, so that the certain contents normally cannot reach the panel during their passage into the entrance/exit space.

According to a characteristic, the door is supported by means of carrying means, so that the panel is arranged and mounted so as to be able to be moved to be in the open state either in a primary open state where a primary separation space is made or in a final open state where a final separation space is made that is larger than the primary separation space.

Thus, the (first) panel of the (first) door of the (first) chamber is able to be separated from the passage of the certain contents from one to the other of the two chambers; this passage is separated so as to facilitate the transfer of the certain contents, and consideration can be given to having a (first) opening larger than those currently known up to the present, the (first) panel being itself also larger, without prejudice to the passage and the transfer of the certain contents.

As appropriate, the separation space is an empty space or, on the contrary, the chamber also comprises a stationary or movable separation wall that, in the open state of the panel, is placed and extends, at least partly, between the panel and the entrance/exit space. In the latter case, this movable separation wall can be structurally combined with the door and/or with its carrying or actuation means.

According to an embodiment, in the open state of the panel, the separation between any area of the panel and the closest boundary of the entrance/exit space is at least equal to one-fourth of the size of the entrance/exit space computed in the direction of this separation. More especially, this separation is at least equal to half of the size of the entrance/exit space computed in the direction of this separation. Even more especially, this separation is at least equal to the size of the entrance/exit space computed in the direction of this separation.

As appropriate, in the open state of the panel, the panel is placed in a position at least approximately parallel or at least approximately orthogonal to the opening, the flange, and the position of the panel in the closed state, or, respectively, in a position at least approximately orthogonal or at least approximately parallel to the axis of the entrance/exit space.

According to an embodiment, in the open state of the panel, the panel is placed in a position at least approximately facing the opening, the flange, and the position of the panel in the closed state. According to another embodiment, it is placed in a lateral position in relation to the opening, the flange, and the position of the panel in the closed state.

According to a characteristic, the carrying means and the movement actuation means of the door are arranged to be able to move the panel between its closed and open or primary open states, in a movement comprising an initial movement of separation of the panel from the flange, which is a movement at least approximately of initial translation along an axis that is at least approximately orthogonal to the opening, the flange, and the position of the panel in the closed state, or a movement of initial rotation around an axis that is at least approximately parallel to the opening, the flange, and the position of the panel in the closed state.

According to a characteristic, the carrying means and the movement actuation means of the door are arranged to be able to move the panel between its closed and open or primary open and final open states, in a movement comprising an initial movement of separation of the panel from the flange and at least one subsequent movement that is a subsequent translational movement and/or at least a subsequent rotational movement.

According to different possibilities, the carrying means and the movement actuation means of the door are arranged to be able to move the panel in a subsequent translational movement along an axis of translation that is at least approximately rectilinear, particularly at least approximately parallel to, or at least approximately orthogonal to, or inclined in relation to the opening, the flange, and the position of the panel in the closed state or along a curvilinear axis of translation.

According to other possibilities, the carrying means and the movement actuation means of the door are arranged to be able to move the panel in a subsequent rotational movement around an axis that is at least approximately parallel to, or at least approximately orthogonal to, the opening, the flange, and the position of the panel in the closed state.

For this purpose, and according to the different possibilities mentioned above, the carrying means and the movement actuation means of the door comprise means for initial separation of the panel from the flange that are translational means along an axis that is at least approximately orthogonal to the opening, the flange, and the position of the panel in the closed state, or rotational means around an axis that is at least approximately parallel to the opening, the flange, and the position of the panel in the closed state. These carrying means and these movement actuation means of the door comprise means for initial separation of the panel from the flange and subsequent movement means that are translational means and/or rotational means.

According to different possibilities, the carrying means and the movement actuation means of the door comprise subsequent movement means of translation along an axis of translation that is at least approximately rectilinear or curvilinear, in particular at least approximately parallel to, or at least approximately orthogonal to, or inclined in relation to the opening, the flange, and the position of the panel in the closed state.

According to other possibilities, the carrying means and the movement actuation means of the door comprise means of subsequent rotation around an axis that is at least approximately parallel to, or at least approximately orthogonal to, the opening, the flange, and the position of the panel in the closed state.

According to an embodiment, the panel of the door is extended laterally in projection, in at least approximately coplanar fashion, by at least one mechanism plate that is part of the carrying means and that makes possible the movement of the panel as a result of the implementation of the movement actuation means.

According to an embodiment, the wall comprises one or more through slots suited to the sealed and aseptic passage of the carrying means and/or of the movement actuation means of the door.

According to a first variant embodiment, the carrying means and the movement actuation means of the door are arranged to be able to move the panel from its closed state in a movement comprising an initial translational movement along an axis that is at least approximately orthogonal to the opening, the flange, and the position of the panel in the closed state, to separate the panel from the flange, and at least a subsequent translational movement along an axis that is at least approximately parallel to the opening, the flange, and the position of the panel in the closed state, and/or a rotational movement around an axis that is at least approximately orthogonal to the opening, the flange, and the position of the panel in the closed state, to bring the panel into its position in the open or primary open or final open state where it is then placed in a lateral position in relation to the opening, the flange, and the position of the panel in the closed state, at least approximately orthogonal to the axis of the entrance/exit space, the separation space being located beyond the lateral boundary of the entrance/exit space.

In this first variant, the carrying means and the movement actuation means of the door can comprise at least a first actuator placed along an axis that is at least approximately orthogonal to the opening, the flange, and the position of the panel in the closed state and that ensures the initial translational movement and either at least a second actuator along an axis that is at least approximately parallel to the opening, the flange, and the position of the panel in the closed state, or at least a system of rotational movement along an axis that is at least approximately orthogonal to the opening, the flange, and the position of the panel in the closed state.

In this first variant, the course of initial translational movement can be just that necessary, aside from the necessary degrees of play, to make possible the subsequent translational movement or rotational movement, without the panel interfering with the wall of the chamber on its inside surface.

In this first variant, in its open or primary open or final open state, the outside surface of the panel can be turned toward and close to the inside surface of the wall of the chamber.

In this first variant, the panel of the door can be laterally extended in projection, in at least approximately coplanar fashion, by at least one mechanism plate supported at least approximately orthogonally by the at least one first actuator that passes through the at least one through slot of the wall, the at least one first actuator being supported by the at least one second actuator or the at least one system of rotational movement.

According to a second variant embodiment, the carrying means and the movement actuation means of the door are arranged to be able to move the panel from its closed state in a movement comprising at least one translational movement along an axis that is at least approximately orthogonal to the opening, the flange, and the position of the panel in the closed state, to separate the panel from the flange, and then to bring the panel into its position in the open, primary open, or final open state, where it is then placed in a position at least approximately facing the opening, the flange, and the position of the panel in the closed state, at least approximately orthogonal to the axis of the entrance/exit space, the separation space being located beyond the end boundary of the entrance/exit space opposite the opening and the flange.

In this second variant, the carrying means and the movement actuation means of the door can comprise at least one actuator placed along an axis that is at least approximately orthogonal to the opening, the flange, and the position of the panel in the closed state.

In this second variant, the course of translational movement can be that necessary to produce the separation space.

In this second variant, in its open or primary open or final open state, the outside surface of the panel can be turned toward and removed from the opening and the flange.

In this second variant, the panel of the door can be laterally extended in projection, in at least approximately coplanar fashion, by at least one mechanism plate supported at least approximately orthogonally by the at least one actuator.

According to a third variant embodiment, the carrying means and the movement actuation means of the door are arranged to be able to move the panel from its closed state in a movement comprising a rotational movement around an axis that is at least approximately parallel to the opening, the flange, and the position of the panel in the closed state, to bring the panel into its position in the open or primary open or final open state where it is then placed in a lateral position in relation to the opening, the flange, and the position of the panel in the closed state, at least approximately orthogonal to the axis of the entrance/exit space, the separation space being located beyond the lateral boundary of the entrance/exit space.

In this third variant, the carrying means and the movement actuation means of the door can comprise at least one system of rotational movement along an axis that is at least approximately parallel to the opening, the flange, and the position of the panel in the closed state.

In this third variant, the course of rotational movement may be close to that of a half-turn.

In this third variant, in its open or primary open or final open state, the outside surface of the panel can be turned opposite the inside surface of the wall of the chamber.

In this third variant, the panel of the door can be laterally extended in projection, in at least approximately coplanar fashion, by a mechanism plate supported by the system of rotational movement.

According to a fourth variant embodiment, the carrying means and the movement actuation means of the door are arranged to be able to move the panel from its closed state in a movement comprising a translational movement along a curvilinear axis corresponding at least approximately to an arc with an axis that is at least approximately parallel to the opening, the flange, and the position of the panel in the closed state.

In this fourth variant, the carrying means and the movement actuation means of the door comprise at least one deformable parallelogram system along an axis that is at least approximately parallel to the opening, the flange, and the position of the panel in the closed state. The course of rotational movement of the deformable parallelogram is, for example, on the order of a half-turn.

In this fourth variant, in its open or primary open or final open state, the outside surface of the panel is turned toward the inside surface of the wall of the chamber.

According to another characteristic, the chamber is especially designed for the biopharmaceutical field, and it comprises an opening having a diameter that is larger than 40 centimeters.

According to a second aspect, the invention has as its object a sealed junction device between a first chamber and a second chamber that are isolated from the external environment, such that the first chamber is a chamber as has just been described, the second chamber comprising:

A second structure that includes a second closed wall that borders a second inside space, At least a second opening made in the second wall and bordered by a second annular flange whose outside surface is able to be flattened in a hermetically-sealed fashion onto the outside surface of the first complementary flange that is part of the first chamber, Removable holding means, at least partly combined with the second flange, able to hold in a removable way the second flange and the first flange flattened against one another by their outside surfaces, A second door whose panel is arranged and mounted so as to be able to be moved to be either in the closed state where it works with the second flange while closing the second opening or in the open state where it is separated from the second flange while opening the second opening, and whose outside surface is able to be flattened in a hermetically-sealed fashion onto the outside surface of the panel of the first complementary door that is part of the first chamber, Removable interlocking means at least partly combined with the second door, able to hold—in a removable way—the panel of the second door and the panel of the first door that are flattened against one another by their outside surfaces, So that when the panels of the first door and the second door are in the open state, the first chamber and the second chamber are in communication with one another by their openings, a communication space that includes the entrance/exit space being made between the two chambers and making it possible to pass certain contents from one to the other, An inside critical annular line of contamination risk existing on the panel of the first door and an outside critical annular line of contamination risk existing on the second flange, the carrying means and the movement actuation means of the first door, structurally integrated into the first door, are such that when the panel of the first door and the panel of the second door are in the open state, a separation space appearing in the form of an empty space of appropriate size is formed and placed between the communication space and the inside critical annular line, the panel of the first door being substantially separated from the entrance/exit space.

According to an embodiment, the sealed junction device between a first chamber and a second chamber that are isolated from the external environment also comprises means that are structurally integrated into the second flange, able—when the panels of the first door and the second door are in the open state—to form a separation between the communication space and the outside critical annular line.

According to an embodiment, the sealed junction device between a first chamber and a second chamber that are isolated from the external environment is such that the means that are structurally integrated into the first door and/or into the second flange are entirely integrated into the first door and/or the second flange.

According to a third aspect, the invention has as its object a sealed transfer device between a first chamber, such as has been previously described, and a second chamber that are isolated from the external environment, comprising a sealed junction device between the two chambers as has just been indicated.

BRIEF DESCRIPTION OF THE DRAWINGS

Now, several embodiments of the invention are described with drawings, in which:

FIG. 2 is a diagram corresponding to FIG. 1, whereas the two flanges and the panels of the two doors of the two chambers are applied to one another, the panels of the doors of the two chambers being in the closed state.

FIG. 3 is a diagram similar to FIG. 2, whereas the second flange is joined to the first flange and the panel of the second door joined to the panel of the first door, once the initial translational movement is performed but before the subsequent rotational movement is performed, the panel of the first door and the panel of the second door being separated from the first flange, without the panel of the first door being already in the fully open state.

FIG. 4 is a diagram similar to FIGS. 2 and 3, once the rotational movement is partially but not completely performed, the panel of the first door not yet being in the fully open state.

FIGS. 6A, 6B and 6C are three diagrams in cutaway illustrating carrying means and movement actuation means of the first door able to move the first panel in an initial translational movement and a subsequent rotational movement.

FIGS. 7A, 7B, 7C and 7D are four diagrams in elevation, from the interior of the first chamber, the first opening, and the panel of the first door, respectively whereas the first panel is in the closed state (FIGS. 1 and 2), is separated from the first opening and from the first flange without yet being in the fully open state (FIG. 3), has been partially pivoted (FIG. 4), has been fully pivoted, and is in the open state (FIG. 5).

FIG. 10 is a diagram corresponding to FIG. 2 of a sealed junction device between a first chamber and a second chamber that are partially shown, whereas the two flanges and the panels of the two doors of the two chambers are applied to one another, the panels of the doors of the two chambers being in the closed state, the sealed junction device comprising, in this embodiment, means structurally integrated into the first door and able to form a separation space between the entrance/exit space and the first panel, the carrying means and the movement actuation means of the first door being arranged to be able to move the first panel from its closed state in an initial translational movement along an axis that is at least approximately orthogonal to the first opening, the first flange, and the first panel when it is in the closed state, and a subsequent translational movement along an axis parallel to the first opening, the first flange, and the first panel when it is in the closed state.

FIG. 11 is a diagram similar to FIG. 10, whereas the second flange is joined to the first flange and the panel of the second door joined to the panel of the first door, once the initial translational movement is performed but before the subsequent translational movement is performed, the panel of the first door being separated from the first opening and from the first flange, without yet being in the fully open state.

FIG. 12 is a diagram similar to FIGS. 10 and 11, once the translational movement is completely performed, the panel of the first door being in the open state, like the panel of the second door, where it is placed in a lateral position in relation to the first opening, the first flange, and the first panel when it is in the closed state, at least approximately orthogonal to the axis of the entrance/exit space, the separation space being located beyond the lateral boundary of the entrance/exit space.

FIG. 14 is a diagram corresponding to FIGS. 2 and 10 of a sealed junction device between a first chamber and a second chamber that are partially shown, whereas the two flanges and the panels of the two doors of the two chambers are applied to one another, the panels of the doors of the two chambers being in the closed state, the sealed junction device comprising, in this embodiment, means structurally integrated into the first door able to form a separation space between the entrance/exit space and the first panel, the carrying means and the movement actuation means of the first door being arranged to be able to move the first panel from its closed state in a translational movement along an axis orthogonal to the first opening, the first flange, and the first panel when it is in the closed state.

FIG. 15 is a diagram similar to FIG. 14, whereas the second flange is joined to the first flange and the panel of the second door is joined to the panel of the first door, once the translational movement is partially but not completely performed, the panel of the first door not yet being in the fully open state.

DETAILED DESCRIPTION OF THE INVENTION

Figure 1:
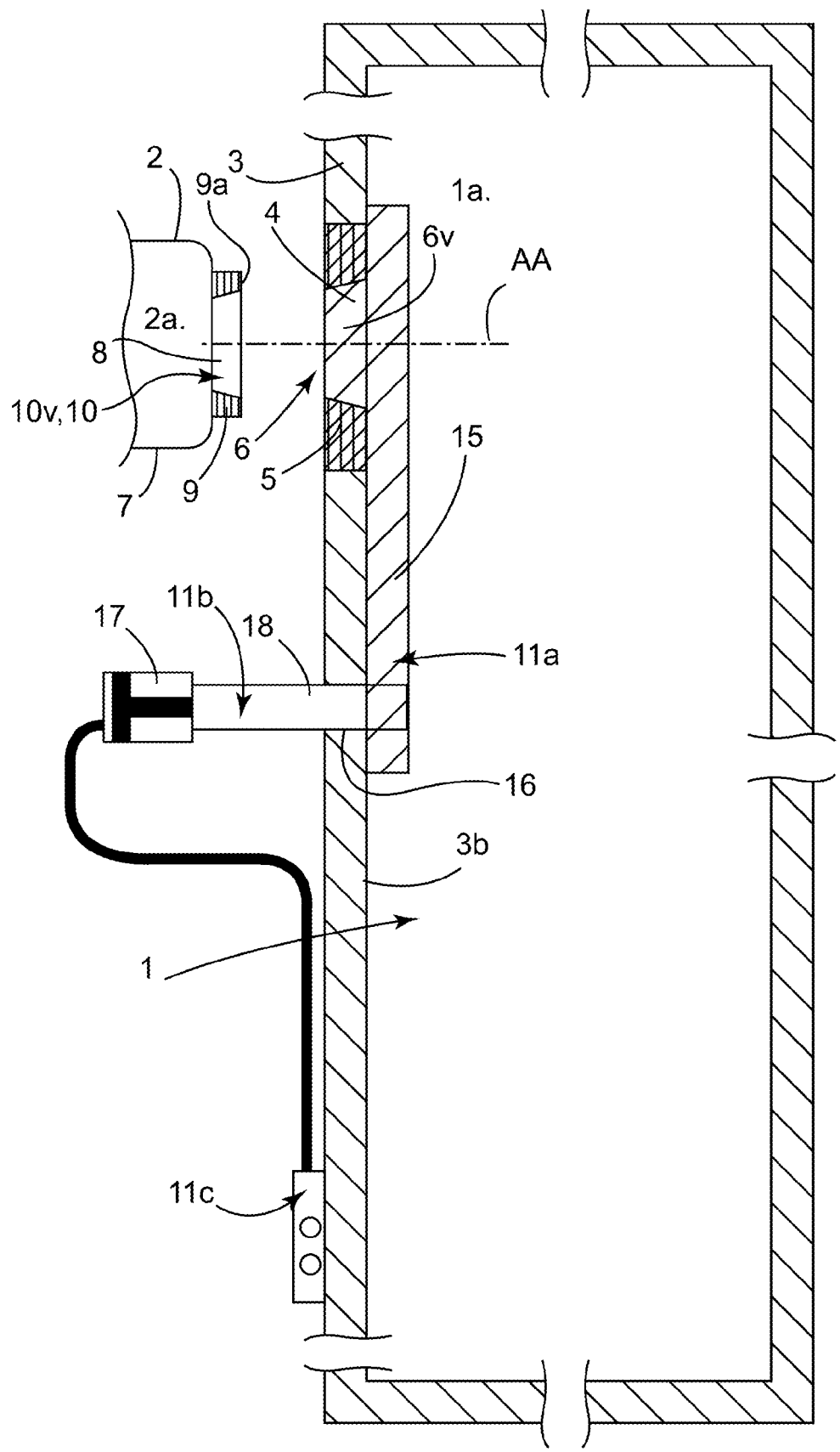
FIG. 1 is a cutaway view, in a cutaway through an axial plane, of a sealed junction device between a first chamber and a second chamber that are partially shown, whereas the two chambers are close to one another but not yet flattened, the panels of the two doors of the two chambers being in the closed state, the sealed junction device comprising means that are structurally integrated into the first door able to form a separation space between the entrance/exit space and the first panel, the carrying means and the movement actuation means of the first door being arranged to be able to move the first panel from its closed state in an initial translational movement along an axis orthogonal to the first opening, the first flange, and the first panel when it is in the closed state and a subsequent rotational movement around an axis that is orthogonal to the first opening, the first flange, and the first panel when it is in the closed state.
Figure 5:
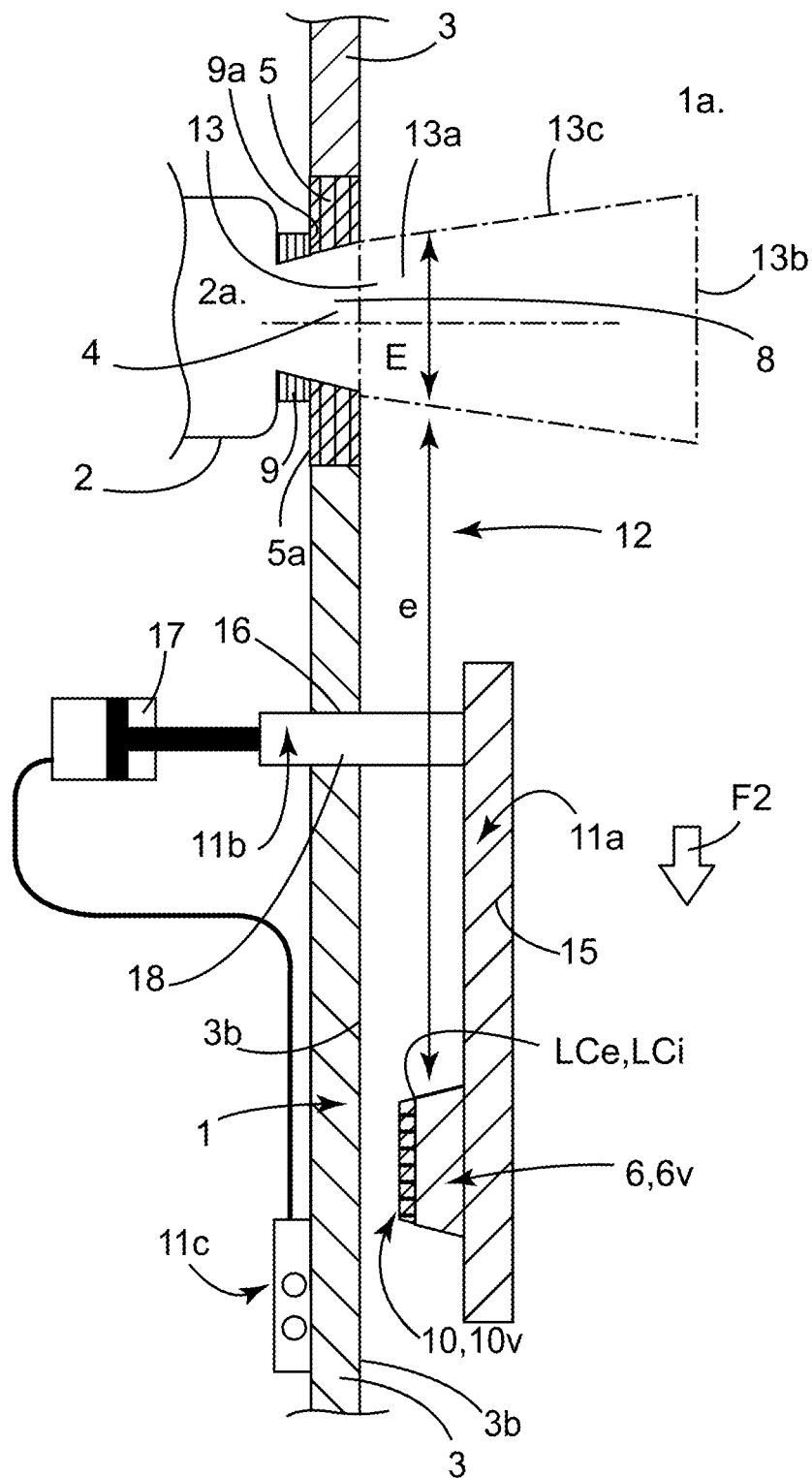
FIG. 5 is a diagram similar to FIGS. 2 to 4, once the rotational movement is completely performed, the panel of the first door being in the open state, like the panel of the second door, where it is placed in a lateral position in relation to the first opening, the first flange, and the first panel when it is in the closed state, at least approximately orthogonal to the axis of the entrance/exit space, the separation space being located beyond the lateral boundary of the entrance/exit space.
Figure 8A:
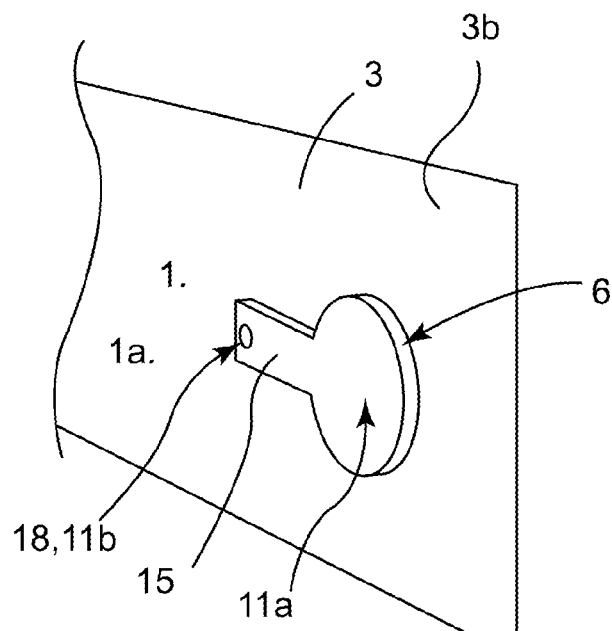
FIGS. 8A, 8B, and 8C are three views in partial perspective, from the interior of the first chamber, corresponding to FIGS. 7A, 7B, and 7C, in the case where the separation space is an empty space.
Figure 8B:
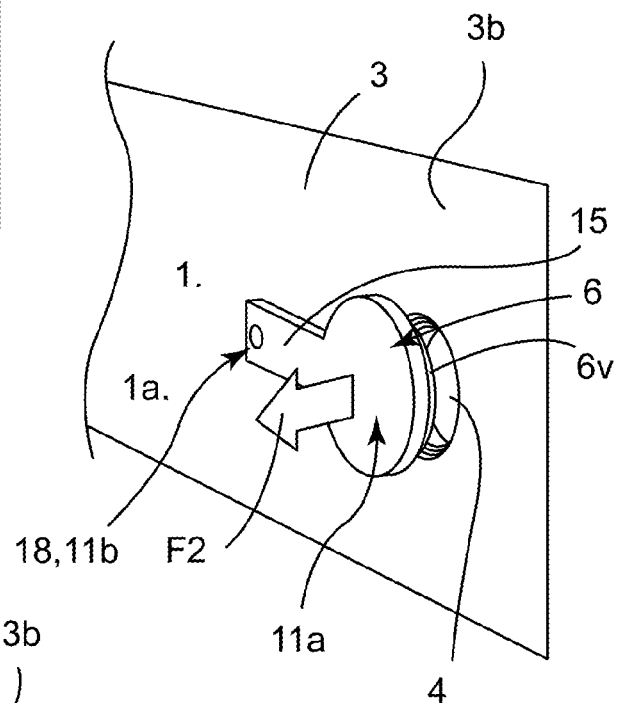
Figure 8C:
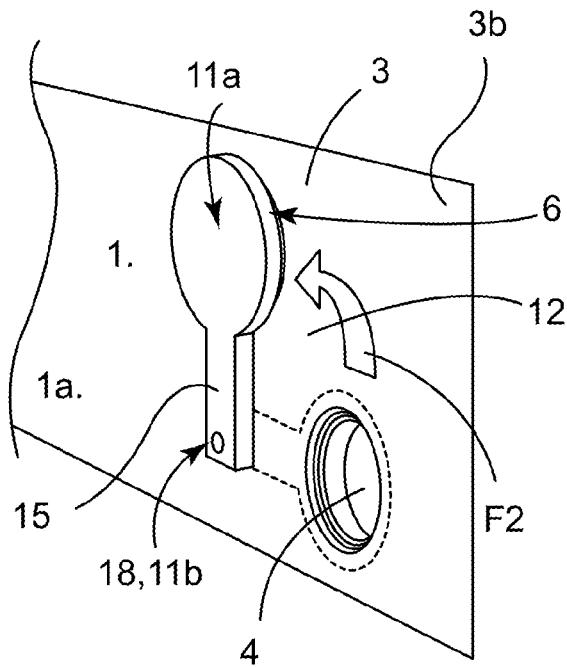

A sealed and aseptic transfer device between a chamber 1 (first chamber 1) and another chamber 2 (second chamber 2) such as the one considered here is called "double-door." By way of example, but not limiting, such a device is of the general type of that known in the art under the trademark BIOSAFE® and described in the document EP-A-0688020.

Such a transfer can be necessary in a number of technical fields, particularly but not exclusively the biopharmaceutical field.

The chamber 1 (first chamber)—for example stationary, rigid and of relatively large size—comprises a structure that includes a first closed wall 3, solid and rigid, but equipped with a first opening 4, itself bordered by a first annular flange 5, with outside surface 5a, both the opening 4 and the flange 5 being, for example, circular, this embodiment not being limiting. According to an embodiment, the first wall is vertical or inclined vertically by an angle on the order of 30° to 45°. The wall 3, having an inside surface 3b, borders the inside space 1a of the chamber 1.

That which is in or toward the inside space 1a bordered by the wall 3 is termed "interior" in connection with the first chamber 1. That which is outside of its inside space 1a bordered by the wall 3 is termed "outside" in connection with the first chamber 1.

The first chamber 1 also comprises a first door 6 supported by the structure, particularly by the wall 3, by means of carrying means 11a that are movable or deformable. The panel 6v of the first door 6 (or first panel 6v) is mounted to move in relation to the first flange 5 forming a seat, and arranged to be moved and brought either to the closed state where it works with the flange 5 by closing the opening 4 or to the open state where it is separated from the flange 5 and placed in the inside space 1a by opening the opening 4. By synecdoche, it will be said that the first door 6 is mounted to move in relation to the first flange 5 to be in the closed state or in the open state, where, respectively, it closes or opens the first opening 4. The panel 6v comprises an outside surface 6a.

If applicable, the first chamber 1 comprises several first doors such as the first door 6, the transfer device being part of an operating line able to make it possible to perform one or more operations before and/or after the transfer, such as manufacturing, treatment, handling, use, measurement, monitoring, analysis, or the like . . . .

The second chamber 2—for example a disposable movable pocket that is at least partially flexible and of a smaller size—comprises a structure that includes a closed second wall 7, solid and flexible, but equipped with a second opening 8, itself bordered by a second annular flange 9, with outside surface 9a, both the opening 8 and the flange 9 being, for example, circular, this embodiment not being limiting. The wall 7 borders the inside space 2a of the chamber 2.

That which is in or toward its inside space 2a bordered by the wall 7 is termed "interior" in connection with the second chamber 2. That which is outside of its inside space 2a bordered by the wall 7 is termed "outside" in connection with the second chamber 2.

The second chamber 2 also comprises a second door 10, having a second panel 10v, with outside surface 10a and inside surface 10b. The panel 10v, mounted to move in relation to the second flange 9 forming a seat, and arranged to be in the closed state or in the open state, where, respectively, it closes or opens the second opening 8. As above, by synecdoche, it will be said that the second door 10 is mounted to move in relation to the second flange 9 to be in the closed state or in the open state where, respectively, it closes or opens the second opening 8.

The aseptic and sealed transfer device is such that when necessary, several second chambers such as the second chamber 2 can be combined with the same first chamber 1, successively if the first chamber 1 comprises a single opening and a single door 4 and 6 and/or simultaneously if the first chamber 1 comprises several openings and doors 4 and 6.

One of the chambers 1, 2, originally contains the certain contents C. For example, the certain contents C are originally in the first chamber 1 or in the second chamber 2, the transfer having as its object to bring it finally, respectively, into the second chamber 2 or into the first chamber 1, and by doing this to pass the certain contents into a communication space 13 made between the two chambers 1 and 2.

The certain contents C have the characteristic of having the purpose to, and therefore being able to, be transferred via the communication space 13. In the biopharmaceutical field, the certain contents can be, for example, a sterile object such as a receptacle, a receptacle element such as a stopper, a syringe, but also elements for environmental testing, and indeed even waste produced during manufacturing or treatment operations, waste that it is a matter of transferring to eliminate it . . . .

Transfers, such as those considered here, occur within the framework of more complex processes in which the certain contents C undergo one or more operations before and/or after the transfer. These operations consist of manufacturing, treatment, handling, use, measurement, monitoring, analysis, or the like, the requirement of asepsis having to be met.

On the other hand, it is important that the transfer of the certain contents C via the communication space 13 not be impeded by the panel 6v of the first door 6 in the open state, that the certain contents C not deteriorate this first panel 6v, and, conversely, that this first panel 6v not deteriorate the certain contents C, therefore that the certain contents C cannot reach the first panel 6v during their transfer.

The invention has as its object both the first chamber 1 as well as the sealed junction device and the transfer device that contains it.

The first flange 5, the first door 6 (more precisely the panel 6v), the second flange 9 and the second door 10 (more precisely the panel 10v) each have an inside surface located toward the interior, respectively, of the first chamber 1, of the second chamber 2, and an outside surface 5a, 6a, 9a, 10a in contact with the environment that is external to the two chambers.

The first flange 5 and the second flange 9 are complementary to one another structurally as well as functionally. They are arranged so as to be able to be held—in a removable way—flattened against one another by their outside surfaces 5a and 9a, hermetically sealed, while thus being isolated from the external environment.

For this purpose, provision is made to equip the flanges 5 and 9 with joining means such as, for example, the complementary shapes given to their respective surfaces 5a and 9a that must be flattened against one another and one or more seals on the second flange 9.

On the other hand, provision is made to combine a removable interlocking mechanism, for example having cams, not shown, with the flanges 5 and 9.

The first door 6 and the second door 10—more precisely their panels 6v and 10v—are complementary to one another structurally as well as functionally. They are arranged so as to be able to be flattened against one another by the outside surfaces 6a and 10a of their respective panels 6v and 10v, hermetically-sealed, while thus being isolated from the external environment.

For this purpose, provision is made to equip the doors 6 and 10—more precisely their panels 6v and 10v—with joining means such as, for example, the complementary shapes given to their respective outside surfaces 6a and 10a that must be flattened against one another and one or more seals.

Movement actuation means 11b are also provided that are able to move the first door 6—more precisely its panel 6v—between its closed and open states.

Monitoring means 11c of the movement actuation means 11b are also provided.

The carrying means 11a that are movable or deformable, the movement actuation means 11b, and the monitoring means 11c are integrated into one another and integrated into the first door 6.

Removable interlocking means are also provided that are combined with the two doors 6 and 10, not shown, able to hold—in a removable way—the two doors 6 and 10—more precisely their panels 6v and 10v—flattened against one another.

It is understood that the first door 6—more precisely the first panel 6v—can pass by and be in an intermediate open state, but not fully open (FIGS. 3, 4, 8B, 9B, 11, 15, 18, 20, 21).

When the first panel 6v is in the closed state, it works with the first opening 4, so that the first opening 4, the first flange 5, and the first panel 6v in the closed state are approximately coplanar except for the thicknesses, the first panel being retracted, in the sense that it does not substantially project from the first wall 3.

When the two doors 6 and 10, respectively the two panels 6v and 10v, are in the open state, there is made between the chambers 1 and 2 a communication space 13 having a general shape corresponding to that of a truncated cylinder with an axis AA passing by the edge of the openings 4 and 8 or a shape close to that of such a truncated cylinder, for example a double truncated cone shape or double truncated pyramid shape having a small median base corresponding to the edge of the openings 4 and 8 and two large bases on either side, respectively in the chambers 1 and 2, particularly in the inside space 1a away from the first opening 4.

The communication space 13 comprises an entrance/exit space 13a in/of the inside space 1a of the first chamber 1.

This entrance/exit space 13a has a general shape of a truncated cylinder, cone, or pyramid, extending into the inside space 1a at least approximately axially with axis AA, from the opening 4 and the flange 5.

This entrance/exit space 13a, shown diagrammatically, is virtually bordered by a proximal end boundary formed by the first opening 4 and the first flange 5, by a distal end boundary 13b opposite the first opening 4 and the first flange 5, and by a lateral boundary 13c between the distal and proximal end boundaries 13b.

The sealed junction device exhibits in operation what one skilled in the art knows by the term of critical line.

An inside critical line LCi is found on the outside surface 6a of the panel 6v of the first door 6 in contact with the external environment and not overlapped by the outside surface 10a of the panel 10v of the second door 10, when the panels 6v and 10v of the two doors 6 and 10 are applied against one another.

An outside critical line LCe is found on the outside surface 9a of the second flange 9 in contact with the external environment and not overlapped by the outside surface 5a first flange 5, when the flanges 5 and 9 are applied against one another.

These critical lines LCi and LCe constitute areas where there is a risk of contamination because they are in contact with the external environment.

These critical lines LCi and LCe are therefore unavoidable because it is impossible that the panel 10v of the second door 10 completely overlaps the panel 6v of the first door 6 and that the outside surface 5a of the first flange 5 completely overlaps the outside surface 9a of the second flange 9, even if the shape and size of the flanges 5 and 9 and of the panels 6v and 10v of the doors 6 and 10, respectively, are selected so that these critical lines LCi and LCe are minimal.

The first chamber 1 is such that the carrying means 11a and the movement actuation means 11b of the first door 6 are arranged so that in the open state of the first panel 6v, the first panel 6v is substantially separated beyond the boundary 13b, 13c of the entrance/exit space 13a, a separation space 12 being thus made between the boundary 13b, 13c of the entrance/exit space 13a and the first panel 6v in the open state.

Figure 16:
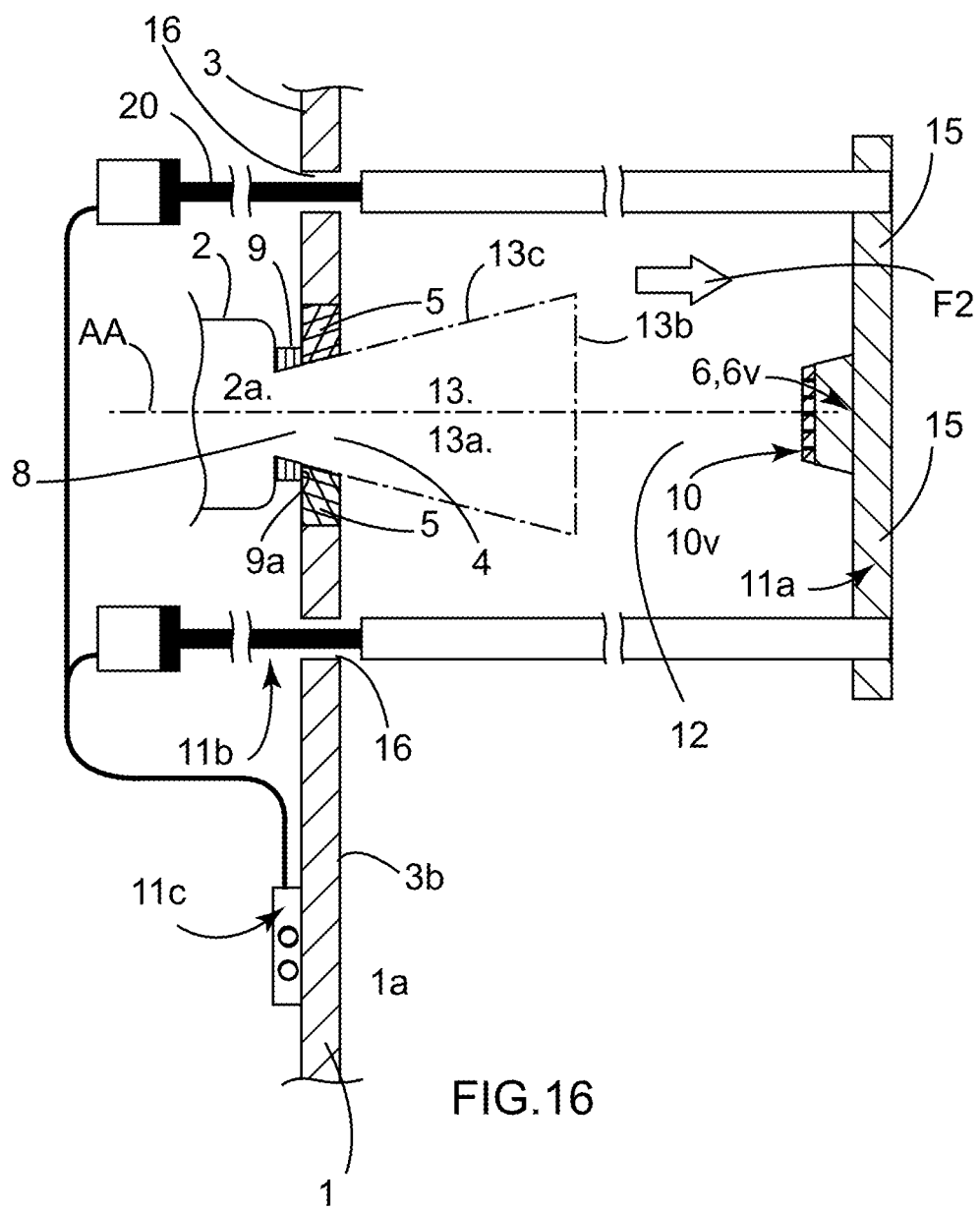
FIG. 16 is a diagram similar to FIGS. 14 and 15, once the translational movement is completely performed, the panel of the first door being in the open state, like the panel of the second door, where it is located in a position at least approximately facing the first opening, the first flange, and the position of the first panel in the closed state, at least approximately orthogonal to the axis of the entrance/exit space, the separation space being located beyond the end boundary of the entrance/exit space opposite the first opening and the first flange.

According to the conceivable embodiments, the separation space 12 is located beyond the lateral boundary 13c of the entrance/exit space 13a (FIGS. 5, 8C, 9C, 12, 13C, 19, 22, 23) or is located beyond its distal end boundary 13b (FIG. 16).

"Substantially separated" is defined as the fact that the first panel 6v is removed and separated outside of the boundary 13b, 13c of the entrance/exit space 13a, and that between any area of the first panel 6v and the closest boundary 13b, 13c of the entrance/exit space 13a, there exists an interval that constitutes a distance $\underline{e}$ that, on the scale of the size $\underline{E}$ of the entrance/exit space 13a computed in the direction of this interval where this distance $\underline{e}$ is computed, not only is not insignificant but in fact is noteworthy and noticeable.

When the separation space 12 is located beyond the lateral boundary 13c of the entrance/exit space 13a, the direction in which $\underline{e}$ and $\underline{E}$ are computed is a direction that is orthogonal to the axis AA. When the separation space 12 is located beyond the distal end boundary 13b of the entrance/exit space 13a, the direction in which $\underline{e}$ and $\underline{E}$ are computed is the axial direction AA.

In the applications more particularly considered where the first opening 4 has a diameter on the order of 10 to 40 centimeters, E can be of the same order of magnitude (10 to 40 centimeters), and the separation $\underline{e}$ that constitutes the separation space 12 can be between a minimal value on the order of 3 and able to go up to 40 centimeters. As indicated, the invention also relates to the case of a first chamber 1 especially designed for the biopharmaceutical field whose opening 4 (and therefore the panel 6v) has a diameter that is larger than the current diameters, let us say a diameter that is larger than 40 centimeters.

Although the separation $\underline{e}$ is not directly dictated size E, it is shown that the separation $\underline{e}$ can be at least equal to one-fourth of $\underline{E}$, or even at least equal to half of E, or even at least equal to $\underline{E}$.

The word "diameter" must be understood as the largest width of the first opening 4, this opening not being necessarily circular.

"Open state of the first panel 6v" is defined as the state in which the separation space 12 is made as has just been defined or a primary open state where a primary separation space 12 is made as has just been defined, the first panel 6v also being able to be in a final open state in which an interval that constitutes a distance that is larger than that of the primary open state is made between it and the entrance/exit space 13a.

With the structure described, the carrying means 11a and the movement actuation means 11b, structurally integrated into the first door 6, constitute means for protection against the risks of contamination for the inside critical line (LCi). Such protection means consist of the separation space 12 formed as has been set forth and placed between the entrance/exit space 13a and the inside critical line (LCi). This separation space 12 has an appropriate size, as has been set forth, so that the certain contents C normally cannot reach the first panel 6v during their passage into the entrance/exit space 13a. That is how the separation space 12 forms protection means of the inside critical line (LCi).

Consequently, the sealed junction device comprises means 11a, 11b that are structurally integrated—particularly fully integrated—into the first door 6, able—when the first door 6 and the second door 10 are in the open state—to form a separation—namely the separation space 12—between the communication space 13 and the inside critical annular line LCi.

According to a possible embodiment, not shown, the sealed junction device also comprises means that are structurally integrated—particularly fully integrated—into the second flange 9 that are able—when the first door 6 and the second door 10, more precisely their panels 6v and 10v, are in the open state—to form a separation between the communication space 13 and the outside critical annular line LCe.

Such means that are structurally integrated into the second flange 9 come, for example, in the form of an annular deflector integrated into the second flange 9, bordering the second opening 8 and projecting from the free frontal plane of the second flange 9 that forms an interface with the first flange 5.

The sealed transfer device that incorporates the sealed junction device therefore comprises, also, the means able—when the first door 6 and the second door 10, more precisely their panels 6v and 10v, are in the open state—to form a separation between the communication space 13 and the inside critical annular line LCi and, if applicable, the outside critical annular line LCe.

Integrated—relative to the means 11a and 11b and the first door 6—is defined as the fact that these means 11a and 11b are, respectively, incorporated into or still included in the first door 6, so as to form a coherent whole with it. In other words, the means 11a and 11b are not, respectively, extraneous to, attached to, or exterior to the door 6.

To express that the certain contents C normally cannot reach the inside critical line LCi, if applicable the outside critical line LCe, during their passage into the entrance/exit space 13a, more generally the communication space 13, signifies that when the certain contents C are passed from one chamber to the other 1, 2, under normal conditions of use of the sealed transfer device, the certain contents C do not come into contact with the critical line LCi, LCe. Normal conditions of use of the sealed transfer device are defined as the fact that the certain contents C are transferred along the path matched to the shape of the communication space 13, for example in the median part of this space.

Figure 9A:
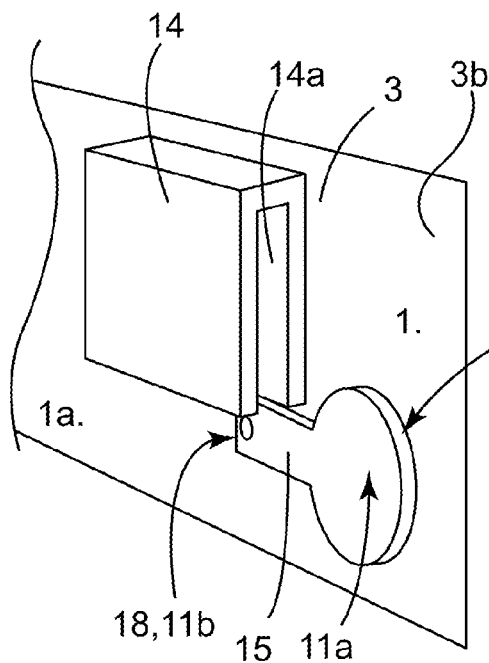
FIGS. 9A, 9B, and 9C are three views similar to FIGS. 8A, 8B, and 8C in the case where the chamber also comprises a stationary separation wall that in the open state of the first panel is placed and extends between the first panel and the entrance/exit space.
Figure 9B:
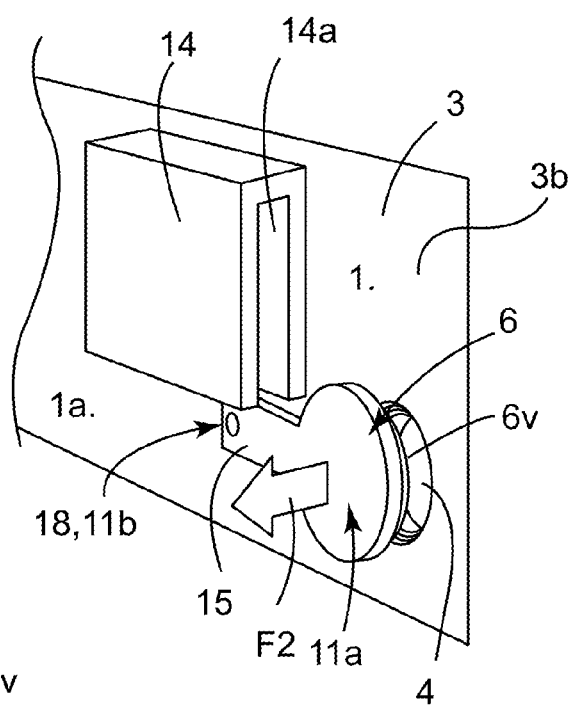
Figure 9C:
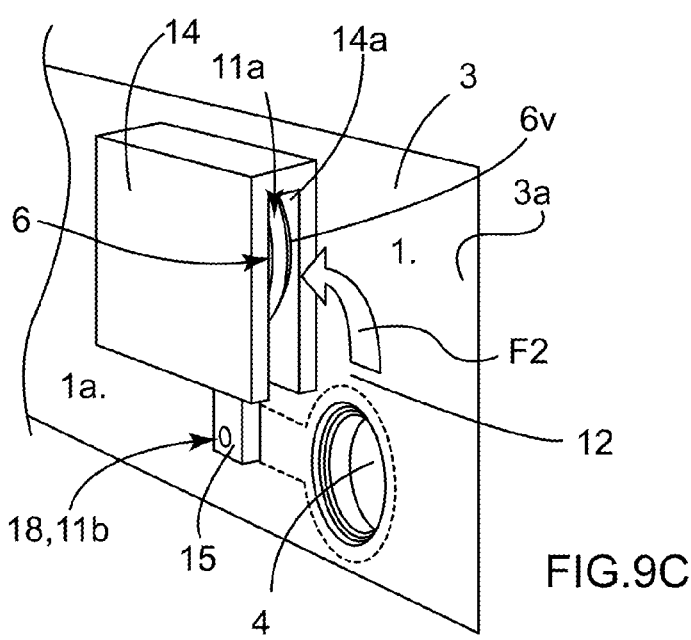
Figure 13A:
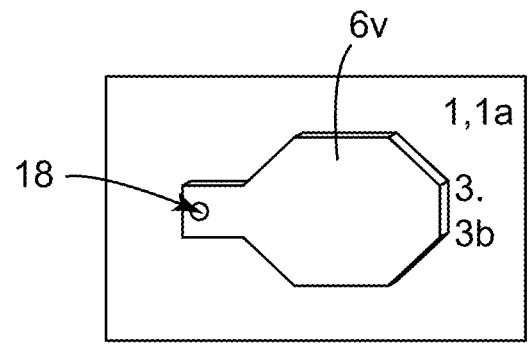
FIGS. 13A, 13B and 13C are three diagrams in elevation, from the interior of the first chamber of the first opening and of the panel of the first door, respectively, whereas the first panel is in the closed state (FIG. 10), is separated from the first flange without yet being in the fully open state (FIG. 11), has been fully slid, and is in the open state (FIG. 12).
Figure 13B:
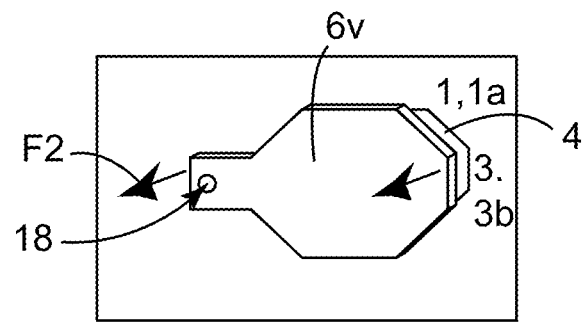
Figure 13C:
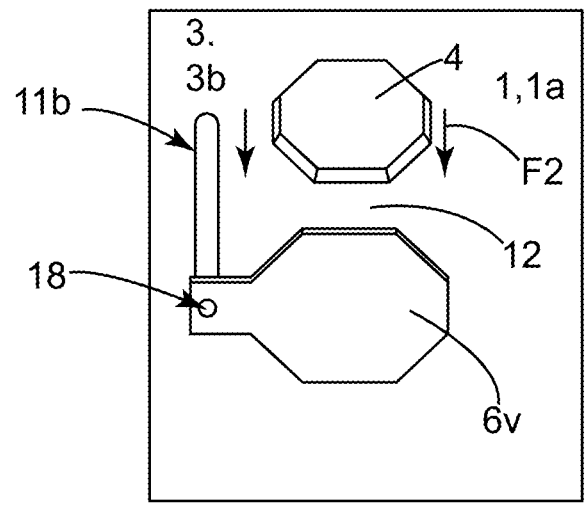

According to the conceivable embodiments, the separation space 12 is an empty space (FIGS. 5, 8C, 12, 16, 19, 22 and 23) or else the chamber 1 also comprises a stationary or movable separation wall 14, 25 that, in the open state of the first panel 6v, is placed and extends, at least partly, between the first panel 6v and the entrance/exit space 13a (FIG. 9C).

Figure 20:
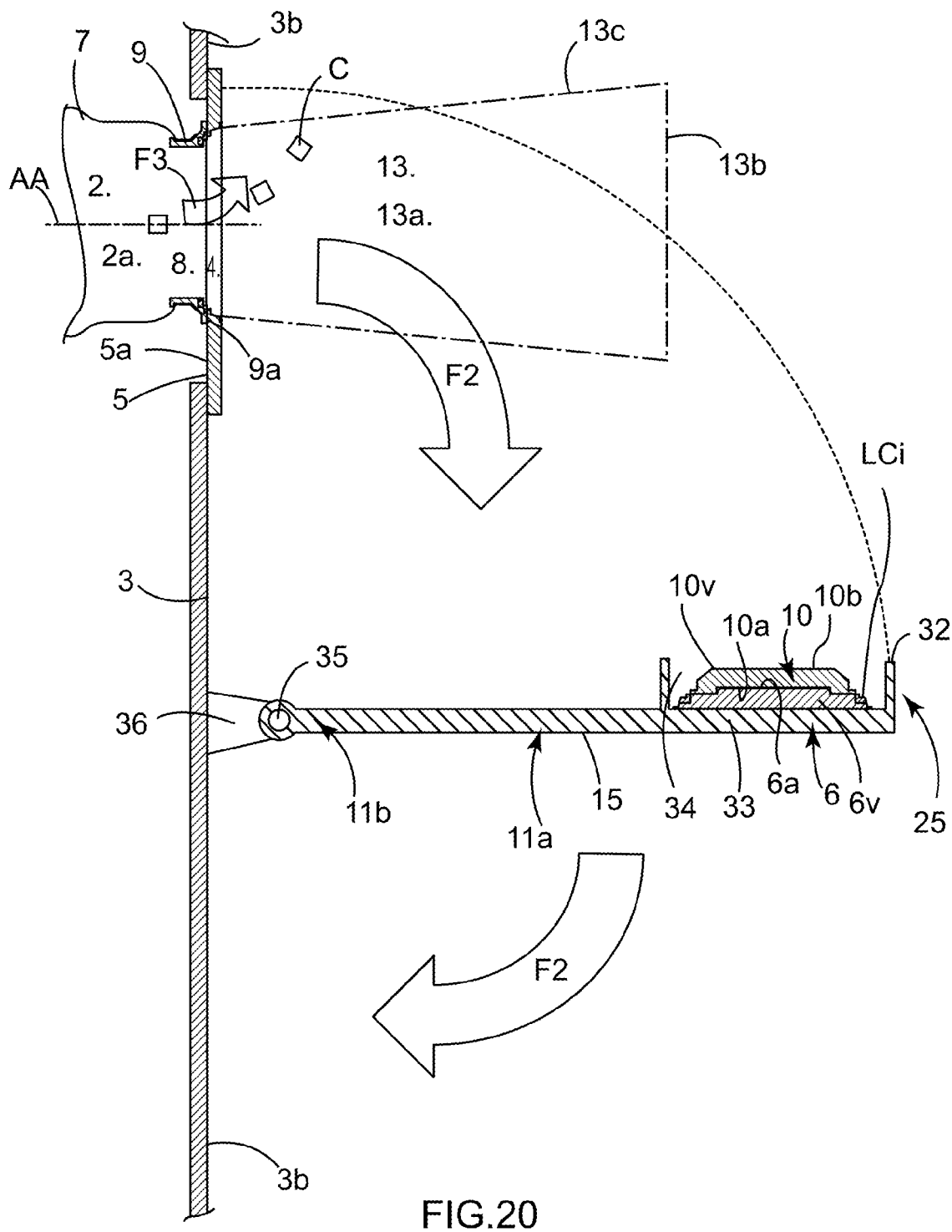
FIG. 20 is a view in axial cutaway of the panel of the first door in a variant comprising also a separation wall in the form of an annular deflector integrated into the first door.
Figure 21:
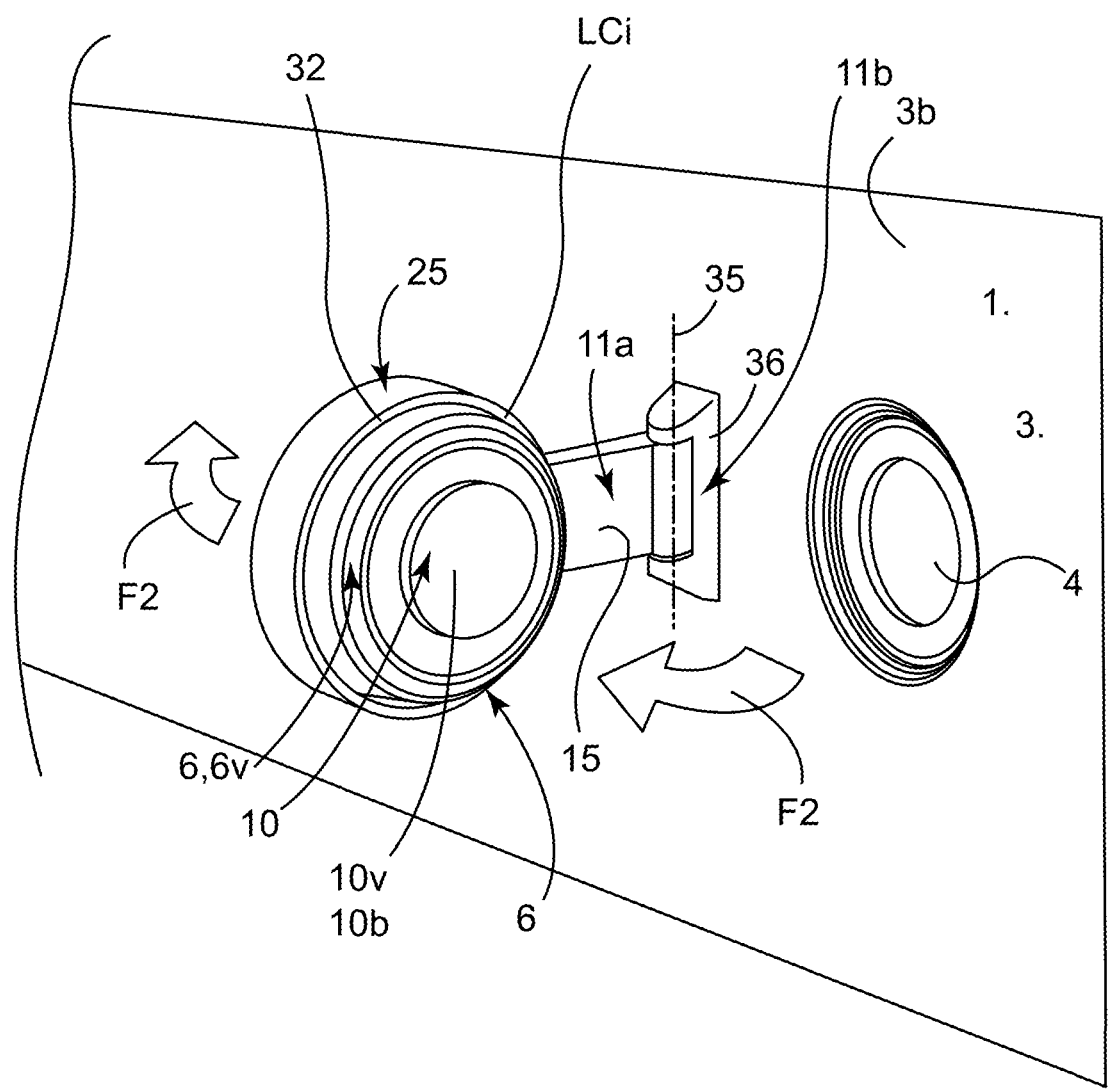
FIG. 21 is a perspective view corresponding to FIG. 20, from the interior of the first chamber.

According to the conceivable embodiments, such a separation wall 14 is stationary (FIGS. 9A, 9B and 9C) or such a separation wall 25 is movable (FIGS. 20 and 21).

According to a conceivable embodiment (FIGS. 9A, 9B and 9C), such a separation wall 14 can be structurally combined with the structure of the first chamber 1, particularly with the first wall 3, in which case the separation wall can be stationary and form with the wall 3 a protective cavity 14a of the inside critical line LCi.

According to another conceivable embodiment (FIGS. 20 and 21), such a separation wall 25 can be structurally combined with the first door 6 and/or with its carrying means 11a or movement actuation means 11b, in which case the separation wall 25 is movable. For example, there can be provided an annular deflector 25 integrated into the first door 6, supported by or being part of the carrying means 11a or the first panel 6v. Such a cylindrical annular deflector 25 forms—with a central part 33 of carrying means 11a—a protective cavity 34 of the inside critical line LCi, with an axial size that is larger, particularly considerably larger, than the axial space requirement of the first panel 6v or than the axial space requirement of the assembly comprising the first panel 6v and the second panel 10v flattened on the first panel 6v.

According to the embodiments shown, the first panel 6v in the open state is placed in a position at least approximately parallel to the first opening 4, the first flange 5, and the first panel 6v when it is in the closed state. In this case, the first panel 6v is placed in a position at least approximately orthogonal to the axis AA of the entrance/exit space 13a.

According to another embodiment, not shown, the first panel 6v in the open state is placed in a position at least approximately orthogonal to the first opening 4, the first flange 5, and the first panel 6v when it is in the closed state. In this case, the first panel 6v is placed in a position at least approximately parallel to the axis AA of the entrance/exit space 13a.

According to the embodiment shown in FIG. 16, the first panel 6v in the open state is placed in a position at least approximately facing the first opening 4, the first flange 5, and the position of the first panel 6v in the closed state. This embodiment corresponds to the case where the separation space 12 is located beyond the distal end boundary 13b of the entrance/exit space 13a.

According to the embodiments shown in FIGS. 5, 8C, 9C, 12, 19, 22 and 23, the first panel 6v in the open state is placed in a lateral position in relation to the first opening 4, the first flange 5, and the first panel 6v when it is in the closed state. This embodiment corresponds to the case where the separation space 12 is located beyond the lateral boundary 13c of the entrance/exit space 13a.

It is understood that when the first chamber 1 is combined with a second chamber 2, within the framework of a sealed junction device and an aseptic transfer device, the first panel 6v supports the second panel 10v, the two panels 6v and 10v being interlocked, flattened against one another by their respective outside surfaces 6a and 10a that are in contact.

The carrying means 11a and the movement actuation means 11b of the first door 6, just like the layout and kinematics of the first door 6, particularly of its panel 6a, can be the object of several structurally different embodiments but all having the effect of seeing to it that in the open state of the first panel 6, the latter is substantially separated beyond the boundary 13b of the entrance/exit space 13, with establishment of the separation space 12.

Generally, the carrying means 11a and the movement actuation means 11b are arranged to be able to move the first panel 6v between its closed and open or primary open states, in a movement comprising an initial movement of separation of the first panel 6v from the first flange 5.

In one embodiment, this initial movement of separation is a movement at least approximately of initial translation along an axis that is at least approximately orthogonal to the first opening 4, the first flange 5, and the position of the first panel 6v in the closed state (FIGS. 3, 8B, 9B, 11, 15).

Figure 17:
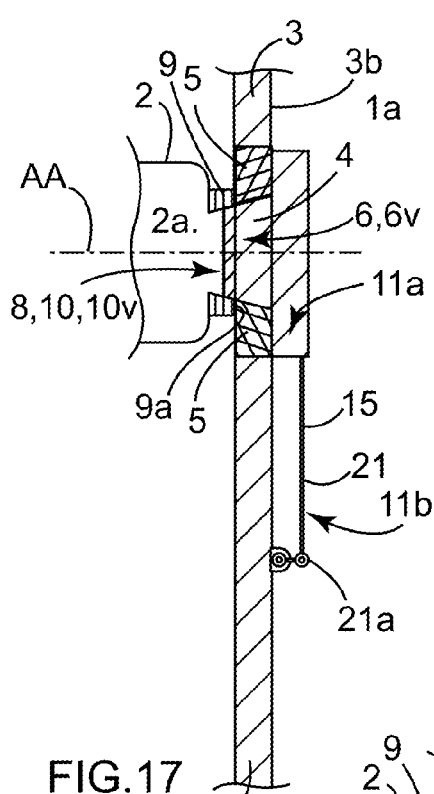
FIG. 17 is a diagram corresponding to FIGS. 2, 10 and 14 of a sealed junction device between a first chamber and a second chamber that are partially shown, whereas the two flanges and the panels of the two doors of the two chambers are applied to one another, the panels of the doors of the two chambers being in the closed state, the sealed junction device comprising, in this embodiment, means structurally integrated into the first door able to form a separation space between the entrance/exit space and the first panel, the carrying means and the movement actuation means of the first door being arranged to be able to move the first panel, supporting the second panel, from its closed state in a rotational movement around an axis that is parallel to the first opening, the first flange, and the first panel when it is in the closed state.
Figure 18:
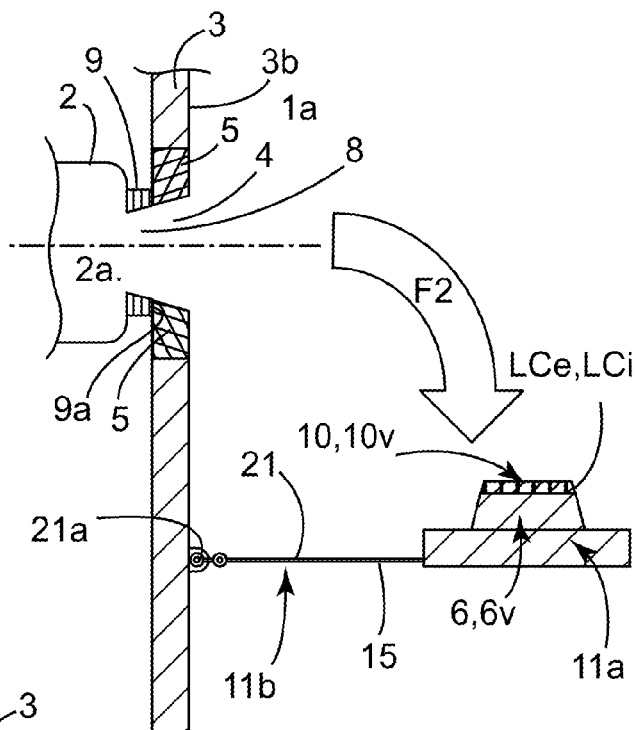
FIG. 18 is a diagram similar to FIG. 17, whereas the second flange is joined to the first flange and the panel of the second door is joined to the panel of the first door once the rotational movement is partially but not completely performed, the panel of the first door not yet being in the fully open state.
Figure 19:
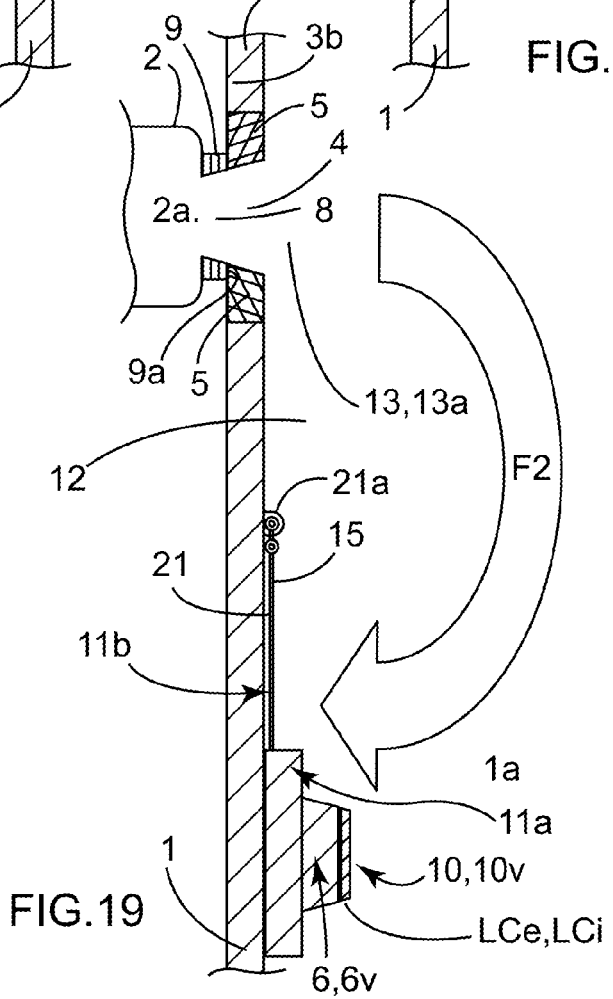
FIG. 19 is a diagram similar to FIGS. 17 and 18, once the rotational movement is completely performed, the panel of the first door being in the open state, like the panel of the second door, where it is placed in a lateral position in relation to the first opening, the first flange, and the first panel when it is in the closed state, at least approximately orthogonal to the axis of the entrance/exit space, the separation space being located beyond the lateral boundary of the entrance/exit space.
Figure 23:
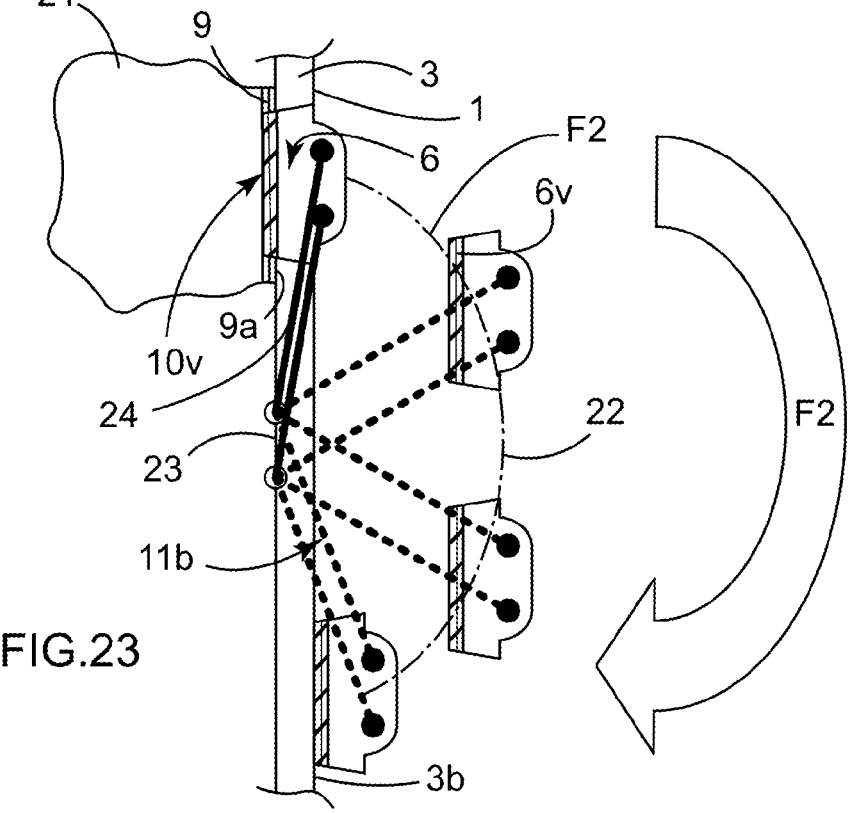
FIG. 23 is a cutaway diagram of the device according to the fourth variant of FIG. 22, when it is in the closed state, in two intermediate open states and in the open state.

In another embodiment, this initial movement of separation is a movement of initial rotation around an axis that is at least approximately parallel to the first opening 4, the first flange 5, and the position of the first panel 6v in the closed state (FIGS. 17, 23).

Not less generally, the carrying means 11a and the movement actuation means 11b are arranged to be able to move the first panel 6v between its closed and open or primary open and final open states, in a movement comprising an initial movement of separation of the first panel 6v from the first flange 5, as has just been indicated, and at least a subsequent movement that is a subsequent translational movement and/or at least a subsequent rotational movement.

This subsequent translational movement or rotational movement can be the object of several embodiments.

In one embodiment, the axis of translation of the subsequent translational movement is an axis that is at least approximately rectilinear.

For example, this axis of translation can be at least approximately parallel to the first opening 4, the first flange 5, and the position of the first panel 6v in the closed state (FIG. 12).

Or, this axis of translation can be approximately orthogonal to the first opening 4, the first flange 5, and the position of the first panel 6v in the closed state (FIG. 16).

Or, according to another embodiment, not shown, this axis of translation can be inclined in relation to the first opening 4, the first flange 5, and the position of the first panel 6v in the closed state.

Figure 22:
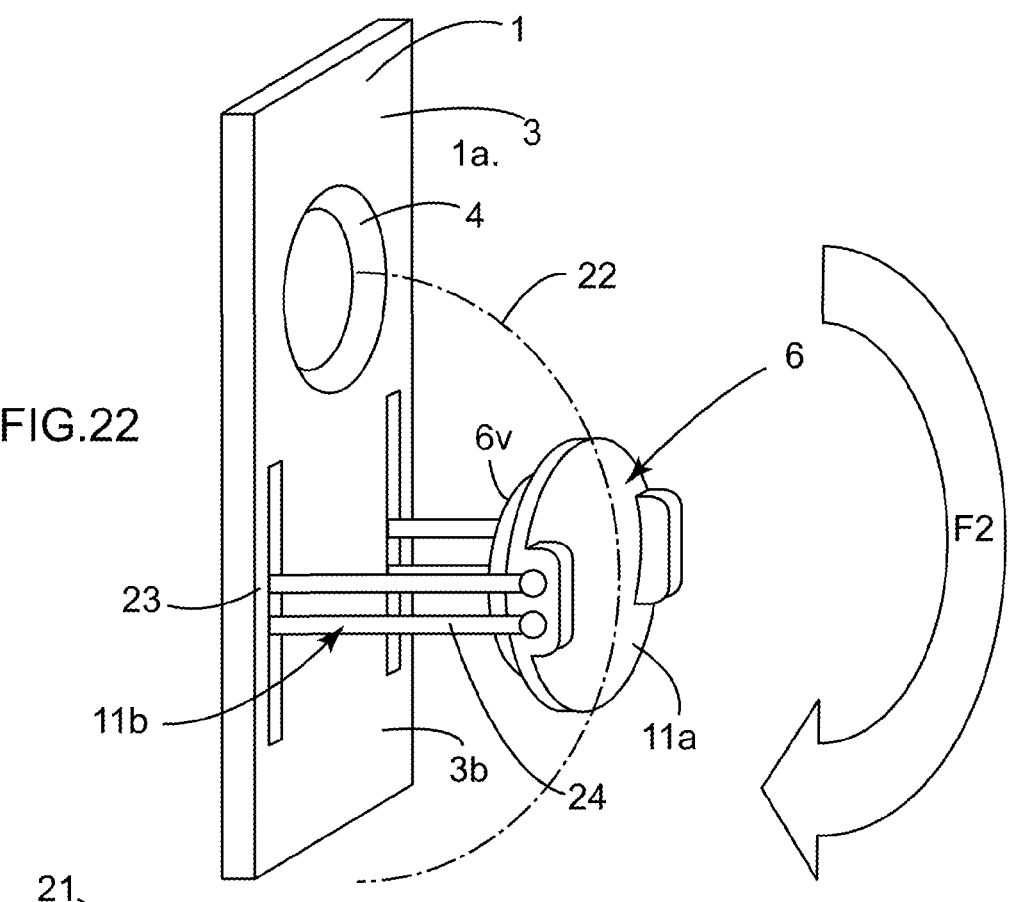
FIG. 22 is a diagram in perspective of a sealed junction device according to a fourth variant embodiment where the carrying means and the movement actuation means of the first door are arranged to be able to move the first panel, supporting the second panel, from its closed state in a translational movement along a curvilinear axis corresponding at least approximately to an arc with an axis that is at least approximately parallel to the opening, the flange, and the position of the panel in the closed state, the carrying means and the movement actuation means of the door comprising at least one deformable parallelogram system.

In another embodiment, the axis of translation of the subsequent translational movement is a curvilinear axis (FIGS. 22 and 23).

In another embodiment, the subsequent movement is a rotation around an axis.

For example, this axis of rotation can be at least approximately parallel to the first opening 4, the first flange 5, and the position of the first panel 6v in the closed state (FIGS. 17, 18, 19, 20, 21, 22 and 23).

Or, this axis of rotation can be approximately orthogonal to the first opening 4, the first flange 5, and the position of the first panel 6v in the closed state (FIGS. 3, 4, 7C and 7D).

The structure and the layout of the carrying means 11a and the movement actuation means 11b are matched to the desired kinematics.

Thus, the carrying means 11a and the movement actuation means 11b comprise means for initial separation of the first panel 6v from the first flange 5 that are means of translation along an axis that is at least approximately orthogonal to the first opening 4, the first flange 5, and the position of the first panel 6v in the closed state, or means of rotation around an axis that is at least approximately parallel to the first opening 4, the first flange 5, and the position of the first panel 6v in the closed state, as previously indicated.

Likewise, the carrying means 11a and the movement actuation means 11b comprise such means of initial separation of the first panel 6v and of the first flange 5 and means of subsequent movement that are translational means and/or rotational means, as previously indicated.

The first panel 6v is laterally extended in projection, in an at least approximately coplanar fashion, by one or more mechanism plates 15 that are part of the carrying means 11a and that make possible the movement of the first panel 6v, following the implementation of the movement actuation means 11b.

According to the embodiments, the first wall 3 comprises one or more through slots 16 suited to the sealed and aseptic passage of the carrying means 11a and/or of the movement actuation means 11b.

Reference is now more particularly made to FIGS. 1 to 9C that illustrate a first mode of execution of the chamber 1 in a first variant embodiment.

In this case, the carrying means 11a and the movement actuation means 11b of the first door 6 are arranged to be able to move the first panel 6v from its closed state in a movement comprising an initial translational movement along an axis that is at least approximately orthogonal to the first opening 4, the first flange 5, and the first panel 6v when it is in the closed state, and this so as to separate the first panel 6v from the first flange as has been previously indicated, and at least a subsequent rotational movement around an axis that is at least approximately orthogonal to the first opening 4, the first flange 5, and the first panel 6v when it is in the closed state, and this so as to bring the first panel into its position in the open or primary open or final open state.

In the embodiment of FIGS. 7A to 7D, the rotational movement is at least approximately a half-turn. In the embodiments of FIGS. 8A to 8C and 9A to 9C, the rotational movement is at least approximately a quarter-turn.

In this open or primary open or final open state, the first panel is placed in a lateral position in relation to the first opening 4, the first flange 5, and the first panel 6v when it is in the closed state, this position being at least approximately orthogonal to the axis AA of the entrance/exit space 13a, while the separation space 12 is located beyond the lateral boundary 13c of the entrance/exit space 13.

In this first variant embodiment and this first mode of execution, the carrying means 11a and the movement actuation means 11b of the first door 6 comprise at least one first actuator 17 placed along an axis that is at least approximately orthogonal to the first opening 4, the first flange 5, and the first panel 6v when it is in the closed state and ensuring the initial translational movement and at least one system 18 of rotational movement along an axis that is at least approximately orthogonal to the first opening 4, the first flange 5, and the first panel 6v when it is in the closed state.

As illustrated in FIGS. 6A, 6B, and 6C, such a system 18 of rotational movement can comprise a shaft 18a having a shaped slot that has an axial part 18b and a part 18c inclined on the axis of the shaft, with which a pin 18d works.

In the embodiment shown, the course of initial translational movement performed using the first actuator 17 is just that necessary, aside from the necessary degrees of play, to make possible, on the one hand, the subsequent rotational movement, without the first panel 6v and the second panel 10v interfering with the first wall 3 of the first chamber 1 on its inside surface 3b and, on the other hand, that the inside surface 10b of the second door (or more precisely of the panel 10v of the second door 10) is found in the vicinity of the inside surface 3b of the first wall 3, so as to not occupy a useful part of the inside space 1a of the first chamber 1 and to see to it that the inside critical line LCi of the open first door 6 is located toward the inside surface 3b of the first wall 3.

In the embodiment shown, the outside surface 6a of the first panel 6v in its open or primary open or final open state is turned toward and particularly close to the inside surface 3b of the first wall 3 of the first chamber 1. Thus, the inside surface 10b of the second panel 10v in its open or primary open or final open state is turned toward and located in the proximity, particularly in the immediate proximity, of the inside surface 3b of the first wall 3 of the first chamber 1.

In this first variant embodiment and this first mode of execution, the first panel 6v of the first door 6 is laterally extended by a mechanism plate 15, which is supported at least approximately orthogonally to the end of the shaft 18a, placed along an axis that is at least approximately orthogonal to the first opening 4, the first flange 5, and the first panel 6v when it is in the closed state.

This shaft 18a passes through a through slot 16 of the first wall 3, where the shaped slots 18b, 18c and the pin 18d are provided.

The first actuator 17 acts on the shaft 18a to cause it to slide along its axis.

The shaft 18a is laterally offset away from the first opening 4 and the first flange 5. On the other hand, it is laterally (parallel to the first wall 3) separated from the first panel 6v of the first door 6 as a result of the presence of the mechanism plate 15.

With a mechanism plate 15 of sufficient length and a sufficient course of rotation, it is possible to make a separation space 12 of sufficiently large size, as indicated.

According to one possibility (FIGS. 8A, 8B and 8C), the panels 6v and 10v of the two doors 6 and 10 in the open state are simply located in the inside space 1a of the first chamber 1, sufficiently removed from the entrance/exit space 13a, as indicated.

According to another possibility (FIGS. 9A, 9B and 9C), a protective cavity 14a of the panels 6v and 10v of the two doors 6 and 10 in the open state, whereas they are flattened against one another, is provided in the first chamber 1. Such a protective cavity 14a is made between the inside surface 3b of the first wall 3 and a separation wall 14 placed parallel to and separated from it. Such a protective cavity 14a comprises an opening for passage of the two panels 6v and 10v by sliding in their own planes. With such a structure, the distance separation is reinforced by a separation barrier.

Reference is now made more particularly to FIGS. 10 to 13C that illustrate a second mode of execution of the chamber 1 in the same first variant embodiment.

In this case, the carrying means 11a and the movement actuation means 11b of the first door 6 are arranged to be able to move the first panel 6v from its closed state in a movement comprising an initial translational movement as in the first mode of execution previously described and at least one subsequent translational movement along an axis that is at least approximately parallel to the first opening 4, the first flange 5, and the first panel 6v when it is in the closed state, and this so as to bring the first panel into its position in the open or primary open or final open state.

In this open or primary open or final open state, the first panel is placed as in the first mode of execution previously described.

In this second mode of execution, the carrying means 11a and the movement actuation means 11b of the first door 6 comprise at least the first actuator 17 placed along an axis that is at least approximately orthogonal to the first opening 4, the first flange 5, and the first panel 6v when it is in the closed state and ensuring the initial translational movement and at least a second actuator 19 along an axis that is at least approximately parallel to the first opening 4, the first flange 5, and the first panel 6v when it is in the closed state.

In the embodiment shown, the course of initial translational movement performed using the first actuator 17 is like that of the first mode of execution previously described.

In the embodiment shown, the outside surface 6a of the first panel 6v in its open or primary open or final open state is placed as in the first mode of execution previously described, and likewise for the surfaces of the second panel 10v.

In this second mode of execution, the first panel 6v of the first door 6 is also laterally extended by at least one mechanism plate 15, which is supported at least approximately orthogonally by the first actuator 17 passing through a through slot 16 of the first wall 3.

The first actuator 17 is supported by the second actuator 19.

Reference is now made more particularly to FIGS. 14 to 16 that illustrate a second variant embodiment of the chamber 1.

In this case, the carrying means 11a and the movement actuation means 11b of the first door 6 are arranged to be able to move the first panel 6v from its closed state in a movement comprising at least a translational movement along an axis that is at least approximately orthogonal to the first opening 4, the first flange 5, and the first panel 6v when it is in the closed state, and this to separate the first panel 6v from the first flange, and then to bring the first panel into its position in the open or primary open or final open state.

In this open or primary open or final open state, the first panel is placed in a position at least approximately facing the first opening 4, the first flange 5, and the first panel 6v when it is in the closed state, this position being at least approximately orthogonal to the axis AA of the entrance/exit space 13a, while the separation space 12 is located beyond the distal end boundary 13b of the entrance/exit space 13a.

In this embodiment, the carrying means 11a and the movement actuation means 11b of the first door 6 comprise at least one actuator 20 placed along an axis that is at least approximately orthogonal to the first opening 4, the first flange 5, and the first panel 6v when it is in the closed state and ensuring the initial translational movement and the subsequent translational movement.

The course of translational movement is that necessary to make the separation space 12.

In the embodiment shown, the outside surface 6a of the first panel 6v in its open or primary open or final open state is turned toward and removed from the first opening 4, the first flange 5, and the first panel 6v when it is in the closed state. Thus, the inside surface 10b of the second panel 10v in its open or primary open or final open state is turned toward and also removed from the first opening 4, the first flange 5, and the first panel 6v when it is in the closed state.

In the embodiment shown, the first panel 6v of the first door 6 is laterally extended by a mechanism plate 15, which is supported at least approximately orthogonally at the end of the actuator 20. Preferentially, two diametrically opposite mechanism plates 15 and two actuators 20 are provided.

Reference is now made more particularly to FIGS. 17 to 21 that illustrate a third variant embodiment of the chamber 1.

In this case, the carrying means 11a and the movement actuation means 11b of the first door 6 are arranged to be able to move the first panel 6v from its closed state in a rotational movement around an axis that is at least approximately parallel to the first opening 4, the first flange 5, and the first panel 6v when it is in the closed state, and this so as to separate the first panel 6v from the first flange and then to bring the first panel 6v into its position in the open or primary open or final open state.

In this open or primary open or final open state, the first panel is placed in a lateral position in relation to the first opening 4, the first flange 5, and the first panel 6v when it is in the closed state, this position being at least approximately orthogonal to the axis AA of the entrance/exit space 13a, while the separation space 12 is located beyond the lateral boundary 13c of the entrance/exit space 13a.

In this embodiment, the carrying means 11a and the movement actuation means 11b of the first door 6 comprise at least one system of rotational movement 21 along an axis 21a that is at least approximately parallel to the first opening 4, the first flange 5, and the first panel 6v when it is in the closed state and ensuring both the initial movement and the subsequent rotational movement.

The system of rotational movement 21 comprises a hinge with an axis 21a and a means for driving in rotation around the axis 21a.

The course of rotational movement is close to that of a half-turn.

In the embodiment shown, the outside surface 6a of the first panel 6v in its open or primary open or final open state is turned opposite the inside surface 3b of the first wall 3 of the first chamber 1. Thus, the inside surface 10b of the second panel 10v in its open or primary open or final open state is turned toward and located in the proximity, particularly in the immediate proximity, of the inside surface 3b of the first wall 3 of the first chamber 1.

In the embodiment shown, the first panel 6v of the first door 6 is laterally extended by a mechanism plate 15, which is supported by the articulation of the system of rotational movement 21.

With a mechanism plate 15 of sufficient length, it is possible to make a separation space 12 of sufficiently large size, as indicated.

Reference is now made more particularly to FIGS. 22 and 23 that illustrate a fourth variant embodiment of the chamber 1.

In this case, the carrying means 11a and the movement actuation means 11b of the first door 6 are arranged to be able to move the panel from its closed state in a movement comprising a translational movement along a curvilinear axis 22 corresponding at least approximately to an arc with an axis 23 that is at least approximately parallel to the first opening 4, the first flange 5, and the first panel 6v when it is in the closed state.

In this embodiment, the carrying means 11a and the movement actuation means 11b of the first door 6 comprise at least one deformable parallelogram system 24 along an axis 23 that is laterally offset in relation to the first opening 4, the first flange 5, and the first panel 6v when it is in the closed state.

For example, the course of rotational movement of the deformable parallelogram 24 is on the order of a half-turn.

In the embodiment shown, the outside surface 6a of the first panel 6v in its open or primary open or final open state is turned toward the inside surface 3b of the first wall 3 of the first chamber 1. Thus, the inside surface 10b of the second panel 10v in its open or primary open or final open state is turned toward and located in the proximity, particularly in the immediate proximity, of the inside surface 3b of the first wall 3 of the first chamber 1.

With an axis 23 that is sufficiently offset laterally in relation to the first opening 4, the first flange 5, and the first panel 6v when it is in the closed state, it is possible to make a separation space 12 of sufficiently large size, as indicated.

The invention claimed is:

1. A first chamber (1) suitable for being combined with a second chamber (2) to form a sealed junction device, the first chamber (1) comprising:

A structure that includes a closed wall (3) that borders an inside space (1a),

At least one opening (4) in the wall (3), the opening bordered by an annular first flange (5) whose outside surface (5a) is configured to ensure a hermetically-sealed flattening onto itself of an outside surface (9a) of a second complementary flange (9) that is part of the second chamber (2), A holding means, configured to hold the first flange (5) and the second flange (9) when they are flattened against one another by their outside surfaces (5a and 9a), A first door (6) supported by the structure by a movable or deformable carrying means (11a), the first door comprising a first panel (6v) configured to be moved to be either in a closed state where it works with the first flange (5) while closing the opening (4), or in an open state where it is separated from the first flange (5) and placed in the inside space (1a) while opening the opening (4), and whose outside surface (6a) is configured to ensure a hermetically-sealed flattening onto itself of an outside surface (10a) of a second panel (10v) of a second complementary door (10) that is part of the second chamber (2), An interlocking means, configured to hold the first panel (6v) and the second panel (10v) when they are flattened against one another by their outside surfaces (6a and 10a), Movement actuation means (11b) configured to move the first panel (6v) between the closed and open states, and means for monitoring the movement actuation means (11b), wherein when the first panel (6v) is in the open state, the entrance/exit of the first chamber (1) being separated, an entrance/exit space (13a) in/of the inside space, in the general shape of a truncated cylinder, cone, or pyramid, that extends into the inside space at least approximately axially from the at least one opening (4) and the first flange (5), the entrance/exit space (13a) being part of a communication space between the two combined chambers making it possible to pass certain contents in to/out of the inside space, from one chamber to the other of the two chambers (1, 2), and An inside critical line (LCi) of contamination risk existing on the outside surface (6a) of the first panel (6v) in contact with the external environment and not overlapped by the outside surface (10a) of the second panel (10v), when the first and second panels (6v and 10v) are flattened against one another, wherein: The carrying means (11a) and the movement actuation means (11b) are arranged so that in the open state, the first panel (6v) is substantially separated beyond the boundary (13b, 13c) of the entrance/exit space (13a), an empty separation space (12) thus being made between the entrance/exit space (13a) and the first panel (6v) in the open state, beyond the lateral boundary (13c) and the distal end boundary (13b) of the entrance/exit space (13a) opposite the at least one opening (4) and the first flange (5), and The carrying means (11a) and the movement actuation means (11b), structurally integrated into the first door (6), constitute means for protection against the risks of contamination for the inside critical line (LCi), constituted by the separation space (12) of appropriate size formed and placed between the entrance/exit space (13a) and the inside critical annular line (LCi), so that the certain contents normally cannot reach the first panel (6v) during their passage into the entrance/exit space (13a).

2. The chamber according to claim 1, wherein the first door (6) is supported by the carrying means (11a), so that the first panel (6v) is arranged and mounted so as to be able to be moved to be in the open state, the open state being either a primary open state where a primary separation space is made or a final open state where a final separation space is made that is larger than the primary separation space.

3. The chamber according to claim 1, further comprising a stationary separation wall (14) or a movable separation wall (25) that, in the open state of the first panel (6v), is placed and extends, at least partly, between the first panel (6v) and the entrance/exit space (13a).

4. The chamber according to claim 1, wherein in the open state, the first panel (6v) is placed in a position at least approximately parallel to or at least approximately orthogonal to the opening (4), the first flange (5), and the position of the first panel (6v) in the closed state, or in a position at least approximately orthogonal to or at least approximately parallel to the axis of the entrance/exit space (13a).

5. The chamber according to claim 1, wherein in the open state of the first panel (6v), the first panel (6v) is placed in a position at least approximately facing the opening (4), the first flange (5), and the position of the first panel (6v) in the closed state, or in a lateral position in relation to the opening (4), the first flange (5), and the position of the first panel (6v) in the closed state.

6. The chamber according to claim 1, wherein the carrying means (11a) and the movement actuation means (11b) of the first door (6) are arranged and mounted so as to be able to move the first panel (6v) between its closed and open or primary open states, in a movement comprising an initial movement of separation of first the panel (6v) from the first flange (5), the movement being at least approximately of initial translation along an axis that is at least approximately orthogonal to the opening (4), the first flange (5), and the position of the first panel (6*v*) in the closed state, or a movement of initial rotation around an axis that is at least approximately parallel to the opening (4), the first flange (5), and the position of the first panel (6*v*) in the closed state.

7. The chamber according to claim 6, wherein the carrying means (11*a*) and the movement actuation means (11*b*) of the first door (6) are arranged and mounted so as to be able to move the first panel (6*v*) between its closed and open or primary open and final open states, in a movement comprising an initial movement of separation of the first panel (6*v*) from the first flange (5), and at least a subsequent movement that is a subsequent translational movement and/or at least a subsequent rotational movement.

8. The chamber according to claim 7, wherein the carrying means (11*a*) and the movement actuation means (11*b*) of the first door (6) are arranged to be able to move the first panel (6*v*) in a subsequent translational movement along an axis of translation that is at least approximately rectilinear or curvilinear.

9. The chamber according to claim 7, wherein the carrying means (11*a*) and the movement actuation means (11*b*) of the first door (6) are arranged to be able to move the first panel (6*v*) in a subsequent rotational movement around an axis that is at least approximately parallel to the opening (4), the first flange (5), and the position of the first panel (6*v*) in the closed state.

10. The chamber according to claim 7, wherein the carrying means (11*a*) and the movement actuation means (11*b*) of the first door (6) are arranged to be able to move the first panel (6*v*) in a subsequent rotational movement around an axis that is at least approximately orthogonal to the opening (4), the first flange (5), and the position of the first panel (6*v*) in the closed state.

11. The chamber according to claim 1, wherein the carrying means (11*a*) and the movement actuation means (11*b*) of the first door (6) comprise means for initial separation of the first panel (6*v*) from the first flange (5) that are means of translation along an axis that is at least approximately orthogonal to the opening (4), the first flange (5), and the position of the first panel (6*v*) in the closed state, or means of rotation around an axis that is at least approximately parallel to the opening (4), the first flange (5), and the position of the first panel (6*v*) in the closed state.

12. The chamber according to claim 1, wherein the carrying means (11*a*) and the movement actuation means (11*b*) of the first door (6) comprise means for initial separation of the first panel (6*v*) from the first flange (5) and subsequent movement means that are translational means and/or rotational means, and, if applicable, means for subsequent translational movement along an axis of translation that is at least approximately rectilinear or curvilinear, or means for subsequent rotation around an axis that is at least approximately parallel to the opening (4), the first flange (5), and the position of the first panel (6*v*) in the closed state, or means for subsequent rotation around an axis that is at least approximately orthogonal to the opening (4), the first flange (5), and the position of the first panel (6*v*) in the closed state.

13. The chamber according to claim 1, wherein the first panel (6*v*) of the first door (6) is laterally extended in projection, in an at least approximately coplanar fashion, by at least one mechanism plate (15) that is part of the carrying means (11*a*) and that makes possible the movement of the first panel (6*v*) as a result of the implementation of the movement actuation means (11*b*).

14. The chamber according to claim 1, wherein the wall (3) comprises one or more through slots (16) suited to the sealed and aseptic passage of the carrying means (11*a*) and/or of the movement actuation means (11*b*) of the first door (6).

15. The chamber according to claim 1, wherein the carrying means (11*a*) and the movement actuation means (11*b*) of the first door (6) are arranged to be able to move the first panel (6*v*) from its closed state in a movement comprising an initial translational movement along an axis that is at least approximately orthogonal to the opening (4), the first flange (5), and the position of the first panel (6*v*) in the closed state, to separate the first panel (6*v*) from the first flange (5), and at least a subsequent translational movement along an axis that is at least approximately parallel to the opening (4), the first flange (5), and the position of the first panel (6*v*) in the closed state, and/or a rotational movement around an axis that is at least approximately orthogonal to the opening (4), the first flange (5), and the position of the first panel (6*v*) in the closed state, to bring the first panel (6*v*) into its position in the open or primary open or final open state where it is then placed in a lateral position in relation to the opening (4), the first flange (5), and the position of the first panel (6*v*) in the closed state, at least approximately orthogonal to the axis of the entrance/exit space (13*a*), the separation space (12) being located beyond the lateral boundary of the entrance/exit space (13*a*).

16. The chamber according to claim 1, wherein the carrying means (11*a*) and the movement actuation means (11*b*) of the first door (6) are arranged to be able to move the first panel (6*v*) from its closed state in a movement comprising at least a translational movement along an axis that is at least approximately orthogonal to the opening (4), the first flange (5), and the position of the first panel (6*v*) in the closed state, to separate the first panel (6*v*) from the first flange (5), and then to bring the first panel (6*v*) into its position in the open, primary open, or final open state, where it is then placed in a position at least approximately facing the opening (4), the first flange (5), and the position of the first panel (6*v*) in the closed state, at least approximately orthogonal to the axis of the entrance/exit space (13*a*), the separation space (12) being located beyond the end boundary of the entrance/exit space (13*a*) opposite the opening (4) and the first flange (5).

17. The chamber according to claim 1, wherein the carrying means (11*a*) and the movement actuation means (11*b*) of the first door (6) are arranged to be able to move the first panel (6*v*) from its closed state in a movement comprising a rotational movement around an axis that is at least approximately parallel to the opening (4), the first flange (5), and the position of the first panel (6*v*) in the closed state, to bring the panel (6*v*) into its position in the open or primary open or final open state where it is then placed in a lateral position in relation to the opening (4), the first flange (5), and the position of the first panel (6*v*) in the closed state, at least approximately orthogonal to the axis of the entrance/exit space (13*a*), the separation space (12) being located beyond the lateral boundary of the entrance/exit space (13*a*).

18. The chamber according to claim 1, wherein the carrying means (11*a*) and the movement actuation means (11*b*) of the first door (6) are arranged to be able to move the first panel (6*v*) from its closed state in a movement comprising a translational movement along a curvilinear axis (22) corresponding at least approximately to an arc with an axis (23) that is at least approximately parallel to the opening (4), the first flange (5), and the position of the first panel (6*v*) in the closed state.

19. The chamber according to claim 1, wherein the at least one opening (4) has a diameter that is larger than 40 centimeters.

20. A sealed junction device between a first chamber (1) and a second chamber (2) that are isolated from the external environment, the first chamber (1) being as defined in claim 1, and the second chamber (2) comprising:

- A second structure that includes a second closed wall (7) that borders a second inside space,
- At least a second opening (4) in the second wall (7), the second opening bordered by a annular second flange (9) whose outside surface (9a) is configured to be flattened, hermetically-sealed, onto the outside surface (5a) of the first complementary flange (5) that is part of the first chamber (1),
- A holding means, at least partly combined with the second flange (9), configured to hold the second flange (9) and the first flange (5) when they are flattened against one another by their outside surfaces (9a and 5a),
- A second door (10) having a second panel (10v) arranged and mounted so as to be able to be moved to be either in a closed state where it works with the second flange (9) while closing the second opening (8), or in an open state where it is separated from the second flange (9) while opening the second opening (8), and whose outside surface (6a) is configured to be flattened, hermetically-sealed, onto the outside surface (6a) of the first panel (6v) of the first complementary door (6) that is part of the first chamber (1),
- An interlocking means, configured to hold the second panel (10v) of the second door (10) and the first panel (6v) of the first door (6) when they are flattened against one another by their outside surfaces (10a and 6a),
  wherein, when the first and second panels (6v and 10v) of the first door (6) and the second door (10) are in the open state, the first chamber (1) and the second chamber (2) are in communication with one another by their openings (4 and 8), a communication space (13) that includes the entrance/exit space (13a) being made between the first and second chambers (1 and 2) and making it possible to pass certain contents from one chamber to the other chamber,
- An inside critical annular line (LCi) of contamination risk existing on the first panel (6v) of the first door (6) and an outside critical annular line (LCe) of contamination risk existing on the second flange (9), the carrying means (11a) and the movement actuation means (11b) of the first door (6), structurally integrated into the first door (6), being such that when the first panel (6v) of the first door (6) and the second panel (10v) of the second door (10) are in the open state, a separation space (12) appearing in the form of an empty space of appropriate size is formed and placed between the communication space (13) and the inside critical annular line (LCi), the first panel (6v) of the first door (6) being substantially separated from the entrance/exit space (13a).

21. The sealed junction device according to claim 20, further comprising means that are structurally integrated into the second flange (9), configured to form a separation between the communication space and the outside critical annular line (LCe) when the first and second panels (6v and 10v) of the first and second doors (6 and 10) are in the open state.

22. The sealed junction device according to claim 20, wherein the means that are structurally integrated into the first door (6) and/or into the second flange (9) are fully integrated into the first door (6) and/or the second flange (9).

* * * * *